US011781605B2

United States Patent
Sugiura

(10) Patent No.: US 11,781,605 B2
(45) Date of Patent: Oct. 10, 2023

(54) CLUTCH DEVICE

(71) Applicant: DENSO CORPORATION, Kariya (JP)

(72) Inventor: Takumi Sugiura, Kariya (JP)

(73) Assignee: DENSO CORPORATION, Kariya (JP)

(*) Notice: Subject to any disclaimer, the term of this patent is extended or adjusted under 35 U.S.C. 154(b) by 28 days.

(21) Appl. No.: 17/582,899

(22) Filed: Jan. 24, 2022

(65) Prior Publication Data

US 2022/0145945 A1    May 12, 2022

Related U.S. Application Data

(63) Continuation of application No. PCT/JP2020/028600, filed on Jul. 23, 2020.

(30) Foreign Application Priority Data

Jul. 26, 2019  (JP) .................................. 2019-138331
Jul. 22, 2020  (JP) .................................. 2020-125633

(51) Int. Cl.
*F16D 23/12*   (2006.01)
*F16D 13/58*   (2006.01)
(Continued)

(52) U.S. Cl.
CPC ............. *F16D 23/12* (2013.01); *F16D 13/58* (2013.01); *F16H 37/124* (2013.01); *H02K 7/108* (2013.01);
(Continued)

(58) Field of Classification Search
CPC .... F16D 23/12; F16D 13/52; F16D 2023/123; F16D 2125/36; F16D 2125/50;
(Continued)

(56) References Cited

U.S. PATENT DOCUMENTS 4,572,313 A * 2/1986 Ono ...................... B62D 1/105
                                                   74/498
10,399,437 B2 * 9/2019 Ruscak ................ B60K 17/046
(Continued)

FOREIGN PATENT DOCUMENTS

JP    S55-100445    7/1980
JP    2003-074645   3/2003
(Continued)

OTHER PUBLICATIONS

U.S. Appl. No. 17/582,482 to Akira Takagi, filed Jan. 24, 2022 (62 pages).
(Continued)

*Primary Examiner* — Jacob S. Scott
*Assistant Examiner* — Farhana Pervin
(74) *Attorney, Agent, or Firm* — Nixon & Vanderhye P.C.

(57) ABSTRACT

A prime mover includes a stator fixed to a housing, and a rotor rotatable relative to the stator. The prime mover is capable of outputting torque from the rotor by being supplied with electric power. A speed reducer is capable of reducing the torque of the prime mover and outputting the reduced torque. The speed reducer includes a sun gear rotatable integrally with the rotor, and planetary gears capable of revolving in a circumferential direction of the sun gear while rotating in a state of meshing with the sun gear. A gear width of the sun gear is set such that a length in the axial direction by which the sun gear and the planetary gear are overlapped is smaller than a gear width of the planetary gear.

13 Claims, 15 Drawing Sheets

(51) Int. Cl.
*F16H 37/12* (2006.01)
*H02K 7/108* (2006.01)
*H02K 7/116* (2006.01)
*F16D 13/52* (2006.01)
*F16D 125/36* (2012.01)
*F16D 125/50* (2012.01)

(52) U.S. Cl.
CPC .............. *H02K 7/116* (2013.01); *F16D 13/52* (2013.01); *F16D 2023/123* (2013.01); *F16D 2125/36* (2013.01); *F16D 2125/50* (2013.01)

(58) Field of Classification Search
CPC .......... F16D 13/46; F16D 28/00; F16D 48/02; F16D 48/06; F16D 13/32; F16H 37/124; F16H 3/54; F16H 13/14; F16H 2200/0034; F16H 1/28; F16H 1/46; F16H 25/12; F16H 2001/2872; F16H 2001/2881; H02K 7/108; H02K 7/116
See application file for complete search history.

(56) References Cited

U.S. PATENT DOCUMENTS

| | | | |
|---|---|---|---|
| 2004/0116230 A1 | 6/2004 | Hakui | |
| 2005/0205377 A1* | 9/2005 | Borgerson | F16D 28/00 192/48.92 |
| 2006/0017251 A1* | 1/2006 | Taneda | B60G 17/019 280/124.106 |
| 2006/0166781 A1* | 7/2006 | Hori | F16H 1/28 475/331 |
| 2012/0046142 A1* | 2/2012 | Miyawaki | F16H 57/082 475/331 |
| 2015/0144453 A1* | 5/2015 | Larkin | B60K 17/35 192/84.7 |
| 2017/0058852 A1* | 3/2017 | Takagi | F02N 11/02 |
| 2017/0128234 A1* | 5/2017 | Roh | F16H 57/0006 |
| 2017/0234373 A1* | 8/2017 | Palazzolo | B60K 17/35 192/84.6 |
| 2018/0347668 A1* | 12/2018 | Yorita | F16H 1/28 |
| 2019/0160654 A1* | 5/2019 | Moritani | B25J 9/0009 |
| 2019/0241259 A1* | 8/2019 | Tsutsumi | B64C 27/08 |
| 2021/0033184 A1* | 2/2021 | Lundstrom | B60K 23/0808 |
| 2022/0001735 A1* | 1/2022 | Finkenzeller | F16D 13/54 |

FOREIGN PATENT DOCUMENTS

| | | |
|---|---|---|
| JP | 2006-090533 | 4/2006 |
| JP | 2010-019271 | 1/2010 |
| JP | 2014-228061 | 12/2014 |
| WO | 2021/020312 | 2/2021 |
| WO | 2021/020313 | 2/2021 |
| WO | 2021/020314 | 2/2021 |
| WO | 2021/020315 | 2/2021 |
| WO | 2021/020316 | 2/2021 |
| WO | 2021/020317 | 2/2021 |
| WO | 2021/020318 | 2/2021 |
| WO | 2021/020320 | 2/2021 |
| WO | 2021/020321 | 2/2021 |

OTHER PUBLICATIONS

U.S. Appl. No. 17/571,165 to Akikazu Uchida, filed Jan. 7, 2022 (61 pages).
U.S. Appl. No. 17/582,754 to Akikazu Uchida, filed Jan. 24, 2022 (44 pages).
U.S. Appl. No. 17/576,394 to Souichirou Hayashi, filed Jan. 14, 2022 (51 pages).
U.S. Appl. No. 17/583,725 to Ryo Ishibashi, filed Jan. 25, 2022 (57 pages).
U.S. Appl. No. 17/582,949 to Ryo Ishibashi, filed Jan. 24, 2022 (44 pages).
U.S. Appl. No. 17/582,410 to Takumi Sugiura, filed Jan. 24, 2022 (67 pages).
U.S. Appl. No. 17/582,593 to Souichirou Hayashi, filed Jan. 24, 2022 (42 pages).
U.S. Appl. No. 17/582,780 to Takumi Sugiura, filed Jan. 24, 2022 (41 pages).
U.S. Appl. No. 17/582,482, filed Jan. 24, 2022, Clutch Device.
U.S. Appl. No. 17/571,165, filed Jan. 7, 2022, Clutch Device.
U.S. Appl. No. 17/582,754, filed Jan. 24, 2022, Clutch Device.
U.S. Appl. No. 17/576,394, filed Jan. 14, 2022, Clutch Device.
U.S. Appl. No. 17/582,899, filed Jan. 24, 2022, Clutch Device.
U.S. Appl. No. 17/583,725, filed Jan. 25, 2022, Clutch Device.
U.S. Appl. No. 17/582,949, filed Jan. 24, 2022, Clutch Device.
U.S. Appl. No. 17/582,410, filed Jan. 24, 2022, Clutch Device.
U.S. Appl. No. 17/582,593, filed Jan. 24, 2022, Clutch Device.
U.S. Appl. No. 17/582,780, filed Jan. 24, 2022, Clutch Device.

* cited by examiner

| INPUT/OUTPUT PATTERN | | | INERTIA MOMENT | REDUCTION RATIO |
|---|---|---|---|---|
| INPUT | OUTPUT | FIXED | | |
| S | D | C | MIDDLE | MIDDLE |
| S | C | D | MIDDLE | MIDDLE |
| C | D | S | LARGE | × (INCREASE) |
| C | S | D | LARGE | × (INCREASE) |
| D | S | C | LARGE | × (INCREASE) |
| D | C | S | LARGE | SMALL |

| INPUT/OUTPUT PATTERN | | | INERTIA MOMENT | REDUCTION RATIO |
|---|---|---|---|---|
| INPUT | OUTPUT | FIXED | | |
| A | D | C | SMALL | LARGE |
| A | C | D | SMALL | LARGE |
| C | D | A | LARGE | × (INCREASE) |
| C | A | D | LARGE | × (INCREASE) |
| D | A | C | LARGE | × (INCREASE) |
| D | C | A | LARGE | SMALL |

US 11,781,605 B2

CLUTCH DEVICE

CROSS REFERENCE TO RELATED APPLICATIONS

The present application is a continuation application of International Patent Application No. PCT/JP2020/028600 filed on Jul. 23, 2020, which designated the U.S. and claims the benefit of priority from Japanese Patent Application No. 2019-138331 filed on Jul. 26, 2019, and Japanese Patent Application No. 2020-125633 filed on Jul. 22, 2020. The entire disclosures of all of the above applications are incorporated herein by reference.

TECHNICAL FIELD

The present disclosure relates to a clutch device.

BACKGROUND

Conventionally, there is known a clutch device that allows or interrupts transmission of torque between a first transmission portion and a second transmission portion by changing a state of a clutch to an engaged state or a disengaged state.

SUMMARY

A clutch device according to at least one embodiment includes a housing, a prime mover, a speed reducer, a rotational translation unit, a clutch, and a state changing unit. The prime mover includes a stator fixed to the housing, and a rotor rotatable relative to the stator. The prime mover outputs torque from the rotor by supply of electric power to the prime mover.

The speed reducer reduces torque of the prime mover and outputs the reduced torque. The rotational translation unit includes a rotation portion that rotates relative to the housing upon receiving an input of the torque output from the speed reducer, and a translation portion that moves relative to the housing in an axial direction in accordance with rotation of the rotation portion relative to the housing.

The clutch is provided between a first transmission portion and a second transmission portion that are rotatable relative to the housing. The clutch allows transmission of torque between the first transmission portion and the second transmission portion in an engaged state of the clutch, and interrupts the transmission of torque between the first transmission portion and the second transmission portion in a disengaged state of the clutch. The state changing unit receives a force along the axial direction from the translation portion and changes a state of the clutch to the engaged state or the disengaged state according to a position of the translation portion in the axial direction relative to the housing.

The speed reducer includes a sun gear rotatable integrally with the rotor, and a planetary gear configured to revolve in a circumferential direction of the sun gear while rotating in a state of meshing with the sun gear.

A gear width of the sun gear is set such that a meshing length between the sun gear and the planetary gear is smaller than a gear width of the planetary gear.

BRIEF DESCRIPTION OF DRAWINGS

The details of one or more embodiments are set forth in the accompanying drawings and the description below. Other features and advantages will be apparent from the description and drawings, and from the claims. In the drawings:

DETAILED DESCRIPTION

Figure 1:
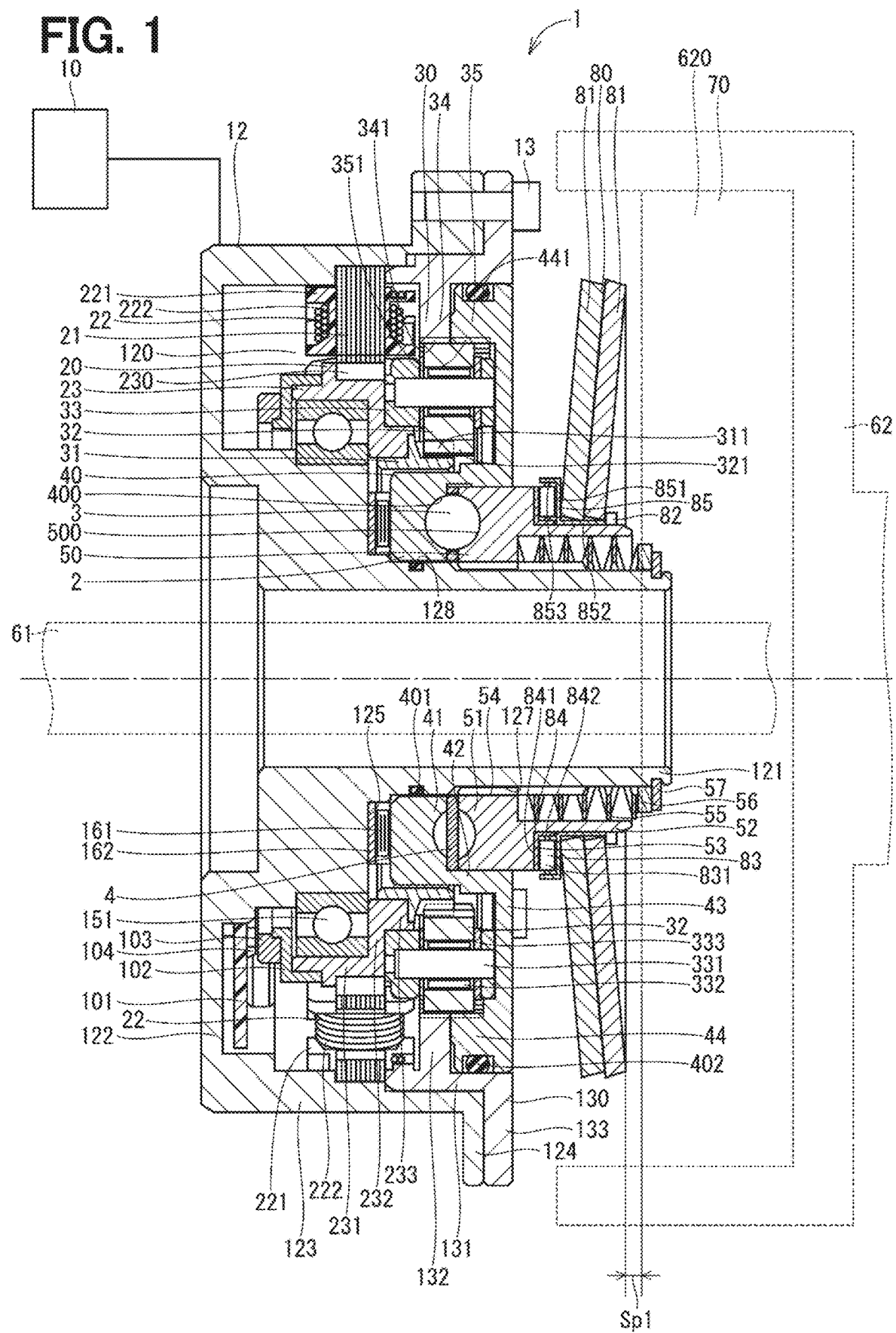
FIG. 1 is a cross-sectional view showing a clutch device according to a first embodiment.

To begin with, examples of relevant techniques will be described.

A clutch device according to a comparative example includes a speed reducer that reduces torque of a prime mover, and the speed reducer includes a sun gear, planetary gears, and two ring gears. Each of the two ring gears has internal teeth capable of meshing with the planetary gears each of which is capable of revolving while rotating in a state of meshing with the sun gear. One of the two ring gears is fixed to a housing that accommodates the speed reducer. The other of the two ring gears is provided so as to be integrally rotatable with a drive cam provided in a ball cam.

The numbers of internal teeth of the two ring gears are set to be different from each other. Accordingly, when the sun gear is rotated by the torque of the prime mover, the drive cam rotates relative to the housing, and a driven cam moves relative to the housing in the axial direction. As a result, the state of the clutch is changed to an engaged state or a disengaged state, and transmission of torque between a first transmission portion and a second transmission portion is allowed or interrupted.

In the clutch device of the comparative example, since it is necessary to arrange the two ring gears in series in the axial direction, a gear width, which is a length of the gears in the axial direction of the planetary gear, inevitably increases. In the clutch device, in order to restrict movement in the axial direction of a carrier that keeps a relative position between the multiple planetary gears, the sun gear protrudes from an end surface of the carrier, and a retaining ring is provided. Therefore, a gear width of the sun gear also increases with the protrusion.

In the speed reducer configured as described above, at the time of the planetary gear tilting with respect to the sun gear, a clearance that has been formed is reduced by a degree proportional to a meshing width and a tilting angle between the sun gear and the planetary gear. When the clearance becomes zero, a so-called double-tooth meshing phenomenon occurs between the sun gear and the planetary gears, and thus the speed reducer may not normally operate.

In contrast, a clutch device according to the present disclosure includes a housing, a prime mover, a speed reducer, a rotational translation unit, a clutch, and a state changing unit. The prime mover includes a stator fixed to the housing, and a rotor rotatable relative to the stator. The prime mover outputs torque from the rotor by supply of electric power to the prime mover.

The speed reducer reduces torque of the prime mover and outputs the reduced torque. The rotational translation unit includes a rotation portion that rotates relative to the housing upon receiving an input of the torque output from the speed reducer, and a translation portion that moves relative to the housing in an axial direction in accordance with rotation of the rotation portion relative to the housing.

The clutch is provided between a first transmission portion and a second transmission portion that are rotatable relative to the housing. The clutch allows transmission of torque between the first transmission portion and the second transmission portion in an engaged state of the clutch, and interrupts the transmission of torque between the first transmission portion and the second transmission portion in a disengaged state of the clutch. The state changing unit receives a force along the axial direction from the translation portion and changes a state of the clutch to the engaged state or the disengaged state according to a position of the translation portion in the axial direction relative to the housing.

The speed reducer includes a sun gear rotatable integrally with the rotor, and a planetary gear configured to revolve in a circumferential direction of the sun gear while rotating in a state of meshing with the sun gear.

A gear width of the sun gear is set such that a meshing length between the sun gear and the planetary gear is smaller than a gear width of the planetary gear. Therefore, even if the planetary gear tilts with respect to the sun gear, a gap in a circumferential direction on a meshing pitch circle between the sun gear and the planetary gears can be secured, and occurrence of double-tooth meshing phenomenon between the sun gear and the planetary gears can be reduced. Therefore, the speed reducer can be maintained operating well.

Hereinafter, clutch devices according to multiple embodiments will be described referring to drawings. In these embodiments, elements that are substantially same may be assigned the same reference numeral, and redundant explanation for the elements may be omitted.

First Embodiment

Figure 2:
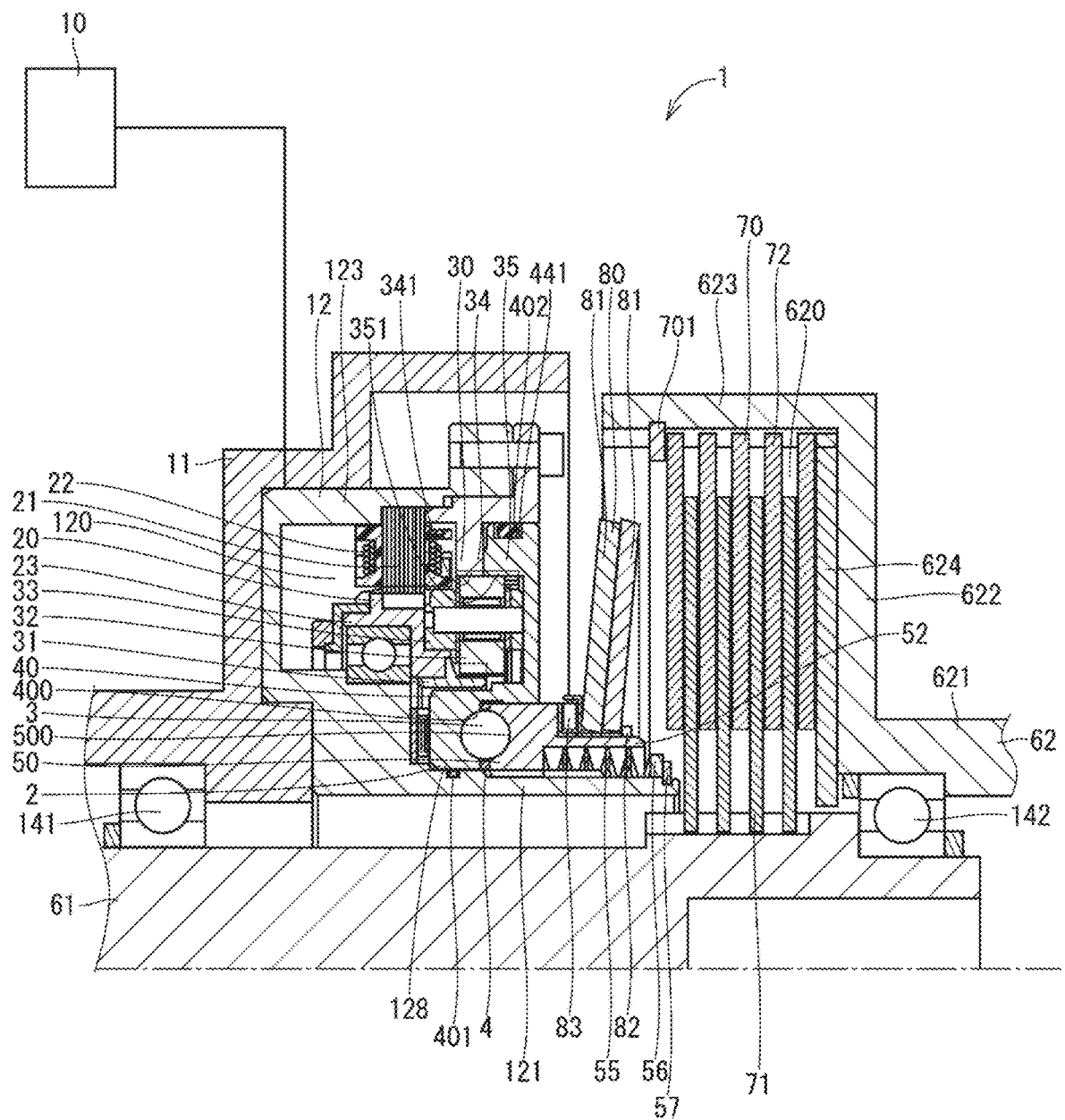
FIG. 2 is a cross-sectional view showing a part of the clutch device according to the first embodiment.

A clutch device according to a first embodiment is shown in FIGS. 1 and 2. A clutch device 1 is provided, for example, between an internal combustion engine and a transmission of a vehicle, and is used to allow or interrupt transmission of torque between the internal combustion engine and the transmission.

The clutch device 1 includes a housing 12, a motor 20 as a "prime mover", a speed reducer 30, a ball cam 2 as a "rotational translation unit" or a "rolling body cam", a clutch 70, and a state changing unit 80.

The clutch device 1 includes an electronic control unit (hereinafter referred to as "ECU") 10 as a "control unit", an input shaft 61 as a "first transmission portion", an output shaft 62 as a "second transmission portion", and a fixing portion 130.

The ECU 10 is a small computer including a CPU as a calculation means, a ROM, a RAM, and the like as storage means, an I/O as an input and output means, and the like. The ECU 10 executes calculation according to a program stored in the ROM or the like based on information such as signals from various sensors provided in each part of the vehicle, and controls operations of various devices and machines of the vehicle. In this way, the ECU 10 executes the program stored in a non-transitory tangible storage medium. With the execution of the program, a method corresponding to the program is executed.

The ECU 10 can control an operation of the internal combustion engine and the like based on the information such as the signals from various sensors. The ECU 10 can also control an operation of the motor 20 to be described later.

The input shaft 61 is connected to, for example, a drive shaft (not shown) of the internal combustion engine, and is rotatable together with the drive shaft. That is, torque is input to the input shaft 61 from the drive shaft.

The vehicle equipped with the internal combustion engine is provided with a fixing flange 11 (see FIG. 2). The fixing flange 11 is formed in a tubular shape, and is fixed to, for example, an engine compartment of the vehicle. A ball bearing 141 is provided between an inner peripheral wall of the fixing flange 11 and an outer peripheral wall of the input shaft 61. Accordingly, the input shaft 61 is bearing-supported by the fixing flange 11 via the ball bearing 141.

The housing 12 is provided between an inner peripheral wall of an end portion of the fixing flange 11 and the outer peripheral wall of the input shaft 61. The housing 12 includes a housing inner cylinder portion 121, a housing plate portion 122, a housing outer cylinder portion 123, a housing flange portion 124, a housing step surface 125, a housing-side spline groove portion 127, and the like.

The housing inner cylinder portion 121 is formed in a substantially cylindrical shape. The housing plate portion 122 is formed in an annular plate shape so as to extend radially outward from an end portion of the housing inner cylinder portion 121. The housing outer cylinder portion 123 is formed in a substantially cylindrical shape so as to extend from an outer edge portion of the housing plate portion 122 to the same side as the housing inner cylinder portion 121. The housing flange portion 124 is formed in an annular plate shape so as to extend radially outward from an end portion of the housing outer cylinder portion 123 opposite to the housing plate portion 122. The housing inner cylinder portion 121, the housing plate portion 122, the housing outer cylinder portion 123, and the housing flange portion 124 are integrally formed of, for example, metal.

The housing step surface 125 is formed in a circular-annular planar shape so as to face the side opposite to the housing plate portion 122 on the radially outer side of the housing inner cylinder portion 121. The housing-side spline groove portion 127 is formed in an outer peripheral wall of the housing inner cylinder portion 121 so as to extend in an axial direction on a side opposite to the housing plate portion 122 with respect to the housing step surface 125. Multiple housing-side spline groove portions 127 are formed in a circumferential direction of the housing inner cylinder portion 121.

The housing 12 is fixed to the fixing flange 11 such that a part of an outer wall of the housing 12 is in contact with a part of a wall surface of the fixing flange 11 (see FIG. 2). The housing 12 is fixed to the fixing flange 11 by a bolt or the like (not shown). The housing 12 is provided coaxially with the fixing flange 11 and the input shaft 61. A substantially cylindrical space is formed between the inner peripheral wall of the housing inner cylinder portion 121 and the outer peripheral wall of the input shaft 61.

The housing 12 has an accommodation space 120. The accommodation space 120 is defined by the housing inner cylinder portion 121, the housing plate portion 122, and the housing outer cylinder portion 123.

The fixing portion 130 includes a fixing cylinder portion 131, a fixing annular portion 132, and a fixing flange portion 133. The fixing cylinder portion 131 is formed in a substantially cylindrical shape. The fixing annular portion 132 is formed in a substantially circular-annular shape so as to extend radially inward from an inner peripheral wall of the fixing cylinder portion 131. The fixing flange portion 133 is formed in a substantially circular-annular shape so as to extend radially outward from an end portion of the fixing cylinder portion 131. The fixing cylinder portion 131, the fixing annular portion 132, and the fixing flange portion 133 are integrally formed of, for example, metal. The fixing portion 130 is fixed to the housing 12 such that the fixing flange portion 133 is fixed to the housing flange portion 124 by a bolt 13.

The motor 20 is accommodated in the accommodation space 120. The motor 20 includes a stator 21, a coil 22, a rotor 23, and the like. The stator 21 is formed in a substantially circular-annular shape by, for example, a laminated steel plate, and is fixed to an inside of the housing outer cylinder portion 123. The coil 22 includes a bobbin 221 and a winding 222. The bobbin 221 is formed of, for example, a resin in a cylindrical shape, and is fitted to multiple salient poles of the stator 21. The winding 222 is wound around the bobbin 221.

The rotor 23 includes a rotor cylinder portion 231, a rotor plate portion 232, and a rotor cylinder portion 233. The motor 20 includes a magnet 230 as a "permanent magnet". The rotor cylinder portion 231 is formed in a substantially cylindrical shape. The rotor plate portion 232 is formed in an annular plate shape so as to extend radially inward from an end portion of the rotor cylinder portion 231. The rotor cylinder portion 233 is formed in a substantially cylindrical shape so as to extend from an inner edge portion of the rotor plate portion 232 toward a side opposite to the rotor cylinder portion 231. The rotor cylinder portion 231, the rotor plate portion 232, and the rotor cylinder portion 233 are integrally formed of, for example, iron-based metal. More specifically, the rotor 23 is formed of, for example, pure iron having relatively high magnetic properties.

The magnet 230 is provided on an outer peripheral wall of the rotor cylinder portion 231. Multiple magnets 230 are provided at equal intervals in a circumferential direction of the rotor cylinder portion 231 such that the magnetic poles are alternately arranged.

The clutch device 1 includes a bearing portion 151. The bearing portion 151 is provided on an outer peripheral wall on the housing plate portion 122 side with respect to the housing step surface 125 of the housing inner cylinder portion 121. An inner peripheral wall of the bearing portion 151 is fitted to an outer peripheral wall of the housing inner cylinder portion 121. The rotor 23 is provided such that an inner peripheral wall of the rotor cylinder portion 231 is fitted to an outer peripheral wall of the bearing portion 151. Accordingly, the rotor 23 is rotatably supported by the housing inner cylinder portion 121 via the bearing portion 151. Therefore, the bearing portion 151 is provided in the accommodation space 120 and rotatably supports the rotor 23.

The rotor 23 is provided so as to be rotatable relatively with respect to the stator 21 on the radially inner side of the stator 21. The motor 20 is an inner rotor type brushless DC motor.

The ECU 10 can control the operation of the motor 20 by controlling electric power supplied to the winding 222 of the coil 22. When the electric power is supplied to the coil 22, a rotating magnetic field is generated in the stator 21, and the rotor 23 rotates. Accordingly, the torque is output from the rotor 23. As described above, the motor 20 includes the stator 21 and the rotor 23 provided to be rotatable relatively with respect to the stator 21, and is capable of outputting the torque from the rotor 23 by being supplied with electric power.

In the present embodiment, the clutch device 1 includes a substrate 101, a plate 102, a sensor magnet 103, and a rotation angle sensor 104. The substrate 101, the plate 102, the sensor magnet 103, and the rotation angle sensor 104 are provided in the accommodation space 120. The substrate 101 is provided on the outer peripheral wall of the housing inner cylinder portion 121 in the vicinity of the housing plate portion 122. The plate 102 is formed in, for example, a substantially cylindrical shape. An inner peripheral wall at one end of the plate 102 is fitted to an outer peripheral wall of an end portion of the rotor cylinder portion 231 opposite to the rotor plate portion 232 so as to be rotatable integrally with the rotor 23. The sensor magnet 103 is formed in a substantially circular-annular shape, and an inner peripheral wall of the sensor magnet 103 is fitted to an outer peripheral wall of the other end of the plate 102 so as to be rotatable integrally with the plate 102 and the rotor 23. The sensor magnet 103 generates a magnetic flux.

The rotation angle sensor 104 is mounted on the substrate 101 so as to face a surface of the sensor magnet 103 opposite to the rotor 23. The rotation angle sensor 104 detects a magnetic flux generated from the sensor magnet 103 and outputs a signal corresponding to the detected magnetic flux to the ECU 10. Accordingly, the ECU 10 can detect a rotation angle, a rotation speed, and the like of the rotor 23 based on the signal from the rotation angle sensor 104. The ECU 10 can calculate, based on the rotation angle, the rotation speed, and the like of the rotor 23, a relative rotation angle of a drive cam 40 with respect to the housing 12 and a driven cam 50 to be described later, relative positions of the driven cam 50 and the state changing unit 80 in the axial direction with respect to the housing 12 and the drive cam 40, and the like.

The speed reducer 30 is accommodated in the accommodation space 120. The speed reducer 30 includes a sun gear 31, planetary gears 32, a carrier 33, a first ring gear 34, a second ring gear 35, and the like.

The sun gear 31 is provided coaxially with and integrally rotatable with the rotor 23. That is, the rotor 23 and the sun gear 31 are formed separately and coaxially disposed so as to be integrally rotatable. More specifically, the sun gear 31 is formed of, for example, metal in a substantially cylindrical shape, and is fixed to the rotor 23 such that an outer peripheral wall of one end portion of the sun gear 31 is fitted to an inner peripheral wall of the rotor cylinder portion 233. In the present embodiment, the sun gear 31 is joined to the rotor 23 by, for example, press-fitting.

The sun gear 31 has a sun gear tooth portion 311 as "tooth portion" and "external teeth". The sun gear tooth portion 311 is formed on the outer peripheral wall of the other end portion of the sun gear 31. The torque of the motor 20 is input to the sun gear 31. The sun gear 31 corresponds to an "input portion" of the speed reducer 30. In the present embodiment, the sun gear 31 is formed of, for example, a steel material.

Multiple planetary gears 32 are provided along the circumferential direction of the sun gear 31, and are each capable of revolving in the circumferential direction of the sun gear 31 while rotating in a state of meshing with the sun gear 31. More specifically, the planetary gears 32 each are formed of, for example, metal in a substantially cylindrical shape, and four planetary gears 32 are provided at equal intervals in the circumferential direction of the sun gear 31 on the radially outer side of the sun gear 31. The planetary gear 32 has a planetary gear tooth portion 321 as "tooth portions" and "external teeth". The planetary gear tooth portion 321 is formed on an outer peripheral wall of the planetary gear 32 so as to be able to mesh with the sun gear tooth portion 311.

The carrier 33 rotatably supports the planetary gears 32 and is rotatable relatively with respect to the sun gear 31. More specifically, the carrier 33 is formed of, for example, metal in a substantially circular-annular shape, and is provided on the radially outer side with respect to the sun gear 31. The carrier 33 is rotatable relatively with respect to the rotor 23 and the sun gear 31.

The carrier 33 is provided with a pin 331, a needle bearing 332, and a carrier washer 333. The pin 331 is formed of, for example, metal in a substantially columnar shape, and is provided on the carrier 33 so as to pass through the inside of the planetary gear 32. The needle bearing 332 is provided between an outer peripheral wall of the pin 331 and an inner peripheral wall of the planetary gear 32. Accordingly, the planetary gear 32 is rotatably supported by the pin 331 via the needle bearing 332. The carrier washer 333 is formed of, for example, metal in an annular plate shape, and is provided between an end portion of the planetary gear 32 and the carrier 33 on the radially outer side of the pin 331. Accordingly, the planetary gears 32 can smoothly rotate relatively with respect to the carrier 33.

The first ring gear 34 has a first ring gear tooth portion 341, which is a tooth portion capable of meshing with the planetary gear 32, and is fixed to the housing 12. More specifically, the first ring gear 34 is formed of, for example, metal in a substantially circular-annular shape. The first ring gear 34 is integrally formed on an inner edge portion of the fixing annular portion 132 of the fixing portion 130. That is, the first ring gear 34 is fixed to the housing 12 via the fixing portion 130. The first ring gear 34 is provided coaxially with the housing 12, the rotor 23, and the sun gear 31. The first ring gear tooth portion 341 as the "tooth portion" and the "internal teeth" is formed on the inner edge portion of the first ring gear 34 so as to be able to mesh with one axial end portion of the planetary gear tooth portion 321 of the planetary gear 32.

The second ring gear 35 has a second ring gear tooth portion 351 which is a tooth portion capable of meshing with the planetary gear 32 and has a different number of teeth from the first ring gear tooth portion 341, and is provided so as to be integrally rotatable with the drive cam 40 to be described later. More specifically, the second ring gear 35 is formed of, for example, metal in a substantially circular-annular shape. The second ring gear 35 is provided coaxially with the housing 12, the rotor 23, and the sun gear 31. The second ring gear tooth portion 351 as the "tooth portion" and the "internal teeth" is formed on the inner edge portion of the second ring gear 35 so as to be able to mesh with the other axial end portion of the planetary gear tooth portion 321 of the planetary gear 32. In the present embodiment, the number of teeth of the second ring gear tooth portion 351 is larger than the number of teeth of the first ring gear tooth portion 341. More specifically, the number of teeth of the second ring gear tooth portion 351 is larger than the number of teeth of the first ring gear tooth portion 341 by the number obtained by multiplying 4, which is the number of the planetary gears 32, by an integer.

Since the planetary gears 32 is required to normally mesh with the first ring gear 34 and the second ring gear 35 having two different specifications at the same portion without interference, the planetary gears 32 is designed such that one or both of the first ring gear 34 and the second ring gear 35 are dislocated to keep a center distance of each gear pair constant.

With the above configuration, when the rotor 23 of the motor 20 rotates, the sun gear 31 rotates, and the planetary gears 32 each revolve in the circumferential direction of the sun gear 31 while rotating with the planetary gear tooth portion 321 of the planetary gears 32 meshing with the sun gear tooth portion 311, the first ring gear tooth portion 341, and the second ring gear tooth portion 351. Since the number of teeth of the second ring gear tooth portion 351 is larger than the number of teeth of the first ring gear tooth portion 341, the second ring gear 35 rotates relatively with respect to the first ring gear 34. Therefore, a minute differential rotation between the first ring gear 34 and the second ring gear 35 corresponding to a difference in the number of teeth between the first ring gear tooth portion 341 and the second ring gear tooth portion 351 is output as the rotation of the second ring gear 35. Accordingly, the torque from the motor 20 is reduced by the speed reducer 30 and is output from the second ring gear 35. In this way, the speed reducer 30 can reduce the torque of the motor 20 and output the reduced torque. In the present embodiment, the speed reducer 30 forms a 3k-type strange planetary gear speed reducer.

The second ring gear 35 is integrally formed with the drive cam 40 to be described later. The second ring gear 35 reduces the torque from the motor 20 and outputs the reduced torque to the drive cam 40. The second ring gear 35 corresponds to an "output portion" of the speed reducer 30.

The ball cam 2 has the drive cam 40 as a "rotation portion", the driven cam 50 as a "translation portion", and a ball 3 as a "rolling body".

The drive cam 40 includes a drive cam main body 41, a drive cam inner cylinder portion 42, a drive cam plate portion 43, a drive cam outer cylinder portion 44, drive cam grooves 400, and the like. The drive cam main body 41 is formed in a substantially circular-annular plate shape. The drive cam inner cylinder portion 42 is formed in a substantially cylindrical shape so as to extend in the axial direction from an outer edge portion of the drive cam main body 41. The drive cam plate portion 43 is formed in a substantially circular-annular plate shape so as to extend radially outward from an end portion of the drive cam inner cylinder portion 42 opposite to the drive cam main body 41. The drive cam outer cylinder portion 44 is formed in a substantially cylindrical shape so as to extend from an outer edge portion of the drive cam plate portion 43 to the same side as the drive cam inner cylinder portion 42. The drive cam main body 41, the drive cam inner cylinder portion 42, the drive cam plate portion 43, and the drive cam outer cylinder portion 44 are integrally formed of, for example, metal.

The drive cam groove 400 is formed so as to extend in the circumferential direction while being recessed from a surface of the drive cam main body 41 on a drive cam inner cylinder portion 42 side. Five drive cam grooves 400 are formed at equal intervals in the circumferential direction of the drive cam main body 41. The drive cam groove 400 is formed such that a groove bottom is inclined with respect to the surface of the drive cam main body 41 on the drive cam inner cylinder portion 42 side such that a depth decreases from one end toward the other end in the circumferential direction of the drive cam main body 41.

The drive cam 40 is provided inside the fixing portion 130 such that the drive cam main body 41 is located between the outer peripheral wall of the housing inner cylinder portion 121 and the inner peripheral wall of the sun gear 31, the drive cam plate portion 43 is located on a side opposite to the rotor 23 with respect to the carrier 33, and the drive cam outer cylinder portion 44 is located on a side opposite to the stator 21 with respect to the fixing annular portion 132 and inside the fixing cylinder portion 131. The drive cam 40 is rotatable relatively with respect to the housing 12 and the fixing portion 130.

The second ring gear 35 is integrally formed with the inner edge portion of the drive cam outer cylinder portion 44. That is, the second ring gear 35 is provided so as to be integrally rotatable with the drive cam 40 serving as the "rotation portion". Therefore, when the torque from the motor 20 is reduced by the speed reducer 30 and is output from the second ring gear 35, the drive cam 40 rotates relatively with respect to the housing 12 and the fixing portion 130. That is, when receiving the torque output from the speed reducer 30, the drive cam 40 rotates relatively with respect to the housing 12.

The driven cam 50 has a driven cam main body 51, a driven cam cylinder portion 52, a driven cam step surface 53, a cam-side spline groove portion 54, driven cam grooves 500, and the like. The driven cam main body 51 is formed in a substantially circular-annular plate shape. The driven cam cylinder portion 52 is formed in a substantially cylindrical shape so as to extend in the axial direction from an outer edge portion of the driven cam main body 51. The driven cam main body 51 and the driven cam cylinder portion 52 are integrally formed of, for example, metal.

The driven cam step surface 53 is formed in a circular-annular planar shape on the radially outer side of the driven cam cylinder portion 52 so as to face a side opposite to the driven cam main body 51. The cam-side spline groove portion 54 is formed in an inner peripheral wall of the driven cam main body 51 so as to extend in the axial direction. Multiple cam-side spline groove portions 54 are formed in the circumferential direction of the driven cam main body 51.

The driven cam 50 is provided such that the driven cam main body 51 is located on a side opposite to the housing step surface 125 with respect to the drive cam main body 41 and on an inner side of the drive cam inner cylinder portion 42, and the cam-side spline groove portion 54 is spline-coupled to the housing-side spline groove portion 127. Accordingly, the driven cam 50 is not rotatable relatively with respect to the housing 12 and is movable with respect to the housing 12 in the axial direction.

The driven cam groove 500 is formed so as to extend in the circumferential direction while being recessed from a surface of the driven cam main body 51 on a side opposite to the driven cam cylinder portion 52. Five driven cam grooves 500 are formed at equal intervals in the circumferential direction of the driven cam main body 51. The driven cam groove 500 is formed such that a groove bottom is inclined with respect to a surface of the driven cam main body 51 opposite to the driven cam cylinder portion 52 such that a depth of the driven cam groove 500 decreases from one end to the other end in the circumferential direction of the driven cam main body 51.

The drive cam groove 400 and the driven cam groove 500 are formed to have the same shape when viewed from a surface side of the drive cam main body 41 on the driven cam main body 51 side or a surface side of the driven cam main body 51 on the drive cam main body 41 side.

The ball 3 is formed in a spherical shape by, for example, metal. The balls 3 are rollably provided between five drive cam grooves 400 and five driven cam grooves 500, respectively. That is, a total of five balls 3 are provided.

In the present embodiment, the clutch device 1 includes a retainer 4. The retainer 4 is formed of, for example, metal in a substantially circular-annular plate shape, and is provided between the drive cam main body 41 and the driven cam main body 51. The retainer 4 has a hole portion having an inner diameter slightly larger than an outer diameter of the ball 3. Five hole portions are formed at equal intervals in the circumferential direction of the retainer 4. The ball 3 is provided in each of the five hole portions. Therefore, the balls 3 are held by the retainer 4, and positions of the balls 3 in the drive cam groove 400 and the driven cam groove 500 are stabilized.

As described above, the drive cam 40, the driven cam 50, and the balls 3 form the ball cam 2 as the "rolling body cam". When the drive cam 40 rotates relatively with respect to the housing 12 and the driven cam 50, the balls 3 roll respectively along the groove bottoms of the drive cam grooves 400 and the driven cam grooves 500.

As shown in FIG. 1, the balls 3 are provided on the radially inner side of the first ring gear 34 and the second ring gear 35. More specifically, the balls 3 are provided within a range in the axial direction of the first ring gear 34 and the second ring gear 35.

As described above, the drive cam groove 400 is formed such that the groove bottom thereof is inclined from one end to the other end. The driven cam groove 500 is formed such that the groove bottom thereof is inclined from one end to the other end. Therefore, when the drive cam 40 rotates relatively with respect to the housing 12 and the driven cam 50 due to the torque output from the speed reducer 30, the balls 3 roll in the drive cam grooves 400 and the driven cam grooves 500, and the driven cam 50 moves with respect to the drive cam 40 and the housing 12 in the axial direction, that is, strokes.

When the drive cam 40 rotates relatively with respect to the housing 12, the driven cam 50 moves with respect to the drive cam 40 and the housing 12 in the axial direction. The driven cam 50 does not rotate relatively with respect to the housing 12 since the cam-side spline groove portion 54 is spline-coupled to the housing-side spline groove portion 127. The drive cam 40 rotates relatively with respect to the housing 12, but does not move relatively with respect to the housing 12 in the axial direction.

In the present embodiment, the clutch device 1 includes a return spring 55, a return spring washer 56, and a C ring 57. The return spring 55 is, for example, a wave spring, and is provided between an outer peripheral wall of an end portion of the housing inner cylinder portion 121 opposite to the housing plate portion 122 and an inner peripheral wall of the driven cam cylinder portion 52. One end of the return spring 55 is in contact with an inner edge portion of a surface of the driven cam main body 51 on a driven cam cylinder portion 52 side.

The return spring washer 56 is formed of, for example, metal in a substantially circular-annular shape, and is in contact with the other end of the return spring 55 on the radially outer side of the housing inner cylinder portion 121. The C ring 57 is fixed to the outer peripheral wall of the housing inner cylinder portion 121 so as to lock a surface of the return spring washer 56 opposite to the return spring 55.

The return spring 55 has a force that extends in the axial direction. Therefore, the driven cam 50 is urged toward the drive cam main body 41 by the return spring 55 in a state where the balls 3 are sandwiched between the driven cam 50 and the drive cam 40.

The output shaft 62 includes a shaft portion 621, a plate portion 622, a cylinder portion 623, and a friction plate 624 (see FIG. 2). The shaft portion 621 is formed in a substantially cylindrical shape. The plate portion 622 is integrally formed with the shaft portion 621 so as to extend radially outward from one end of the shaft portion 621 in an annular plate shape. The cylinder portion 623 is integrally formed with the plate portion 622 so as to extend in a substantially cylindrical shape from an outer edge portion of the plate portion 622 toward a side opposite to the shaft portion 621. The friction plate 624 is formed in a substantially circular-annular plate shape, and is provided on an end surface of the plate portion 622 on a cylinder portion 623 side. The friction plate 624 is not rotatable relatively with respect to the plate portion 622. A clutch space 620 is formed inside the cylinder portion 623.

An end portion of the input shaft 61 passes through the inside of the housing inner cylinder portion 121 and is located on a side opposite to the drive cam 40 with respect to the driven cam 50. The output shaft 62 is provided coaxially with the input shaft 61 on a side opposite to the fixing flange 11 with respect to the housing 12, that is, on a side opposite to the drive cam 40 with respect to the driven cam 50. A ball bearing 142 is provided between an inner peripheral wall of the shaft portion 621 and an outer peripheral wall of the end portion of the input shaft 61. Accordingly, the output shaft 62 is bearing-supported by the input shaft 61 via the ball bearing 142. The input shaft 61 and the output shaft 62 are rotatable relatively with respect to the housing 12.

The clutch 70 is provided in the clutch space 620 between the input shaft 61 and the output shaft 62. The clutch 70 includes an inner friction plate 71, an outer friction plate 72, and a locking portion 701. Multiple inner friction plates 71 each are formed in a substantially circular-annular plate shape, and are provided so as to be aligned in the axial direction between the input shaft 61 and the cylinder portion 623 of the output shaft 62. The inner friction plates 71 are provided such that inner edge portions thereof are spline-coupled to the outer peripheral wall of the input shaft 61. Therefore, the inner friction plates 71 are not rotatable relatively with respect to the input shaft 61 and are movable with respect to the input shaft 61 in the axial direction.

Multiple outer friction plates 72 each are formed in a substantially circular-annular plate shape, and are provided so as to be aligned in the axial direction between the input shaft 61 and the cylinder portion 623 of the output shaft 62. The inner friction plates 71 and the outer friction plates 72 are alternately arranged in the axial direction of the input shaft 61. The outer friction plates 72 are provided such that outer edge portions thereof are spline-coupled to an inner peripheral wall of the cylinder portion 623 of the output shaft 62. Therefore, the outer friction plates 72 is not rotatable relatively with respect to the output shaft 62 and is movable with respect to the output shaft 62 in the axial direction. Among the multiple outer friction plates 72, the outer friction plate 72 located closest to the friction plate 624 is contactable with the friction plate 624.

The locking portion 701 is formed in a substantially circular-annular shape, and is provided such that an outer edge portion is fitted into the inner peripheral wall of the cylinder portion 623 of the output shaft 62. The locking portion 701 can lock an outer edge portion of the outer friction plate 72 located closest to the driven cam 50 among the multiple outer friction plates 72. Therefore, the multiple outer friction plates 72 and the multiple inner friction plates 71 are prevented from coming off from the inside of the cylinder portion 623. A distance between the locking portion 701 and the friction plate 624 is larger than a sum of plate thicknesses of the multiple outer friction plates 72 and the multiple inner friction plates 71.

In an engaged state in which the multiple inner friction plates 71 and the multiple outer friction plates 72 are in contact with each other, that is, engaged with each other, a frictional force is generated between the inner friction plates 71 and the outer friction plates 72, and relative rotation between the inner friction plates 71 and the outer friction plates 72 is restricted according to a magnitude of the frictional force. On the other hand, in a disengaged state in which the multiple inner friction plates 71 and the multiple outer friction plates 72 are separated from each other, that is, are not engaged with each other, no frictional force is generated between the inner friction plates 71 and the outer friction plates 72, and the relative rotation between the inner friction plates 71 and the outer friction plates 72 is not restricted.

When the clutch 70 is in the engaged state, the torque input to the input shaft 61 is transmitted to the output shaft 62 via the clutch 70. On the other hand, when the clutch 70 is in the disengaged state, the torque input to the input shaft 61 is not transmitted to the output shaft 62.

In this way, the clutch 70 transmits the torque between the input shaft 61 and the output shaft 62. The clutch 70 allows transmission of the torque between the input shaft 61 and the output shaft 62 in the engaged state in which the clutch 70 is engaged, and interrupts the transmission of the torque between the input shaft 61 and the output shaft 62 in the disengaged state in which the clutch 70 is not engaged.

In the present embodiment, the clutch device 1 is a so-called normally open clutch device that is normally in the disengaged state.

The state changing unit 80 includes a disk spring 81 as an "elastic deformation portion", a C ring 82, and a thrust bearing 83. The state changing unit 80 includes two disk springs 81. The two disk springs 81 are provided on the radially outer side of the driven cam cylinder portion 52 and on a side opposite to the driven cam main body 51 with respect to the driven cam step surface 53 in a state where the disk springs 81 overlap each other in the axial direction.

The thrust bearing 83 is provided between the driven cam cylinder portion 52 and the disk spring 81. The thrust bearing 83 includes a roller 831, an inner ring portion 84, and an outer ring portion 85. The inner ring portion 84 includes an inner ring plate portion 841 and an inner ring cylinder portion 842. The inner ring plate portion 841 is formed in a substantially circular-annular plate shape. The inner ring cylinder portion 842 is formed in a substantially cylindrical shape so as to extend from an inner edge portion of the inner ring plate portion 841 toward one side in the axial direction. The inner ring plate portion 841 and the inner ring cylinder portion 842 are integrally formed of, for example, metal. The inner ring portion 84 is provided such that the inner ring plate portion 841 is contactable with the driven cam step surface 53, and the inner peripheral wall of the inner ring cylinder portion 842 is contactable with the outer peripheral wall of the driven cam cylinder portion 52.

The outer ring portion 85 includes an outer ring plate portion 851, an outer ring cylinder portion 852, and an outer ring cylinder portion 853. The outer ring plate portion 851 is formed in a substantially circular-annular plate shape. The outer ring cylinder portion 852 is formed in a substantially cylindrical shape so as to extend from an inner edge portion of the outer ring plate portion 851 to one side in the axial direction. The outer ring cylinder portion 853 is formed in a substantially cylindrical shape so as to extend from an outer edge portion of the outer ring plate portion 851 to the other side in the axial direction. The outer ring plate portion 851, the outer ring cylinder portion 852, and the outer ring cylinder portion 853 are integrally formed of, for example, metal. The outer ring portion 85 is provided on the radially outer side of the driven cam cylinder portion 52 on a side opposite to the driven cam step surface 53 with respect to the inner ring portion 84. The two disk springs 81 are located on the radially outer side of the outer ring cylinder portion 852. The inner peripheral wall of the outer ring cylinder portion 852 is slidable on the outer peripheral wall of the driven cam cylinder portion 52.

The roller 831 is provided between the inner ring portion 84 and the outer ring portion 85. The roller 831 is rollable between the inner ring plate portion 841 and the outer ring plate portion 851. Accordingly, the inner ring portion 84 and the outer ring portion 85 are rotatable relatively with respect to each other.

One disk spring 81 in the two disk springs 81 is provided such that one end thereof in the axial direction, that is, an inner edge portion thereof is contactable with the outer ring plate portion 851. The C ring 82 is fixed to the outer peripheral wall of the driven cam cylinder portion 52 so as to be able to lock one end in the axial direction of the other disk spring 81 in the two disk springs 81 and an end portion of the outer ring cylinder portion 852. Therefore, the two disk springs 81 and the thrust bearing 83 are prevented from coming off from the driven cam cylinder portion 52 by the C ring 82. The disk spring 81 is elastically deformable in the axial direction.

When the ball 3 is located at one end of the drive cam groove 400 and the driven cam groove 500, a distance between the drive cam 40 and the driven cam 50 is relatively small, and a gap Sp1 is formed between the clutch 70 and the other end in the axial direction of the other disk spring 81 in the two disk springs 81, that is, the outer edge portion (see FIG. 1). Therefore, the clutch 70 is in the disengaged state, and transmission of torque between the input shaft 61 and the output shaft 62 is interrupted.

When electric power is supplied to the coil 22 of the motor 20 under the control of the ECU 10, the motor 20 rotates, the torque is output from the speed reducer 30, and the drive cam 40 rotates relatively with respect to the housing 12. Accordingly, the ball 3 rolls from one end to the other end of the drive cam groove 400 and the driven cam groove 500. Therefore, the driven cam 50 moves relatively with respect to the housing 12 in the axial direction, that is, moves toward the clutch 70 while compressing the return spring 55. Accordingly, the disk springs 81 move toward the clutch 70.

When the disk springs 81 move toward the clutch 70 due to the movement of the driven cam 50 in the axial direction, the gap Sp1 reduces, and the other end in the axial direction of the other disk spring 81 in the two disk springs 81 comes into contact with the outer friction plate 72 of the clutch 70. When the driven cam 50 further moves in the axial direction after the disk spring 81 comes into contact with the clutch 70, the disk spring 81 presses the outer friction plate 72 toward a friction plate 624 side while being elastically deformed in the axial direction. Accordingly, the multiple inner friction plates 71 and the multiple outer friction plates 72 are engaged with each other, and the clutch 70 is brought into the engaged state. The torque transmission between the input shaft 61 and the output shaft 62 is allowed.

At this time, the two disk springs 81 rotate relatively with respect to the driven cam cylinder portion 52 together with the outer ring portion 85 of the thrust bearing 83. At this time, the roller 831 rolls between the inner ring plate portion 841 and the outer ring plate portion 851 while receiving a load in a thrust direction from the disk spring 81. The thrust bearing 83 bearing-supports the disk spring 81 while receiving the load in the thrust direction from the disk spring 81.

When a clutch transmission torque reaches a clutch required torque capacity, the ECU 10 stops the rotation of the motor 20. Accordingly, the clutch 70 is in an engagement maintaining state in which the clutch transmission torque is maintained at the clutch required torque capacity. As described above, the disk springs 81 of the state changing unit 80 receives a force in the axial direction from the driven cam 50, and can change the state of the clutch 70 to the engaged state or the disengaged state according to a relative position of the driven cam 50 in the axial direction with respect to the housing 12 and the drive cam 40.

In the output shaft 62, an end portion of the shaft portion 621 opposite to the plate portion 622 is connected to an input shaft of a transmission (not shown), and the output shaft 62 is rotatable together with the input shaft. That is, the torque output from the output shaft 62 is input to the input shaft of the transmission. The torque input to the transmission is changed in speed by the transmission, and is output to driving wheels of the vehicle as a drive torque. Accordingly, the vehicle travels.

Next, a 3k-type strange planetary gear speed reducer adopted by the speed reducer 30 according to the present embodiment will be described.

In an electric clutch device as in the present embodiment, it is required to shorten a time required for an initial response to reduce an initial gap (corresponding to the gap Sp1) between the clutch and an actuator. It can be seen from an equation of rotation motion that it is sufficient to reduce an inertia moment around the input shaft in order to speed up the initial response. The inertia moment in a case where the input shaft is a solid cylindrical member increases in proportion to a fourth power of an outer diameter when compared with constant length and density. In the clutch device 1 according to the present embodiment, the sun gear 31 corresponding to the "input shaft" here is a hollow cylindrical member, whereas a tendency does not change.

Figure 3:
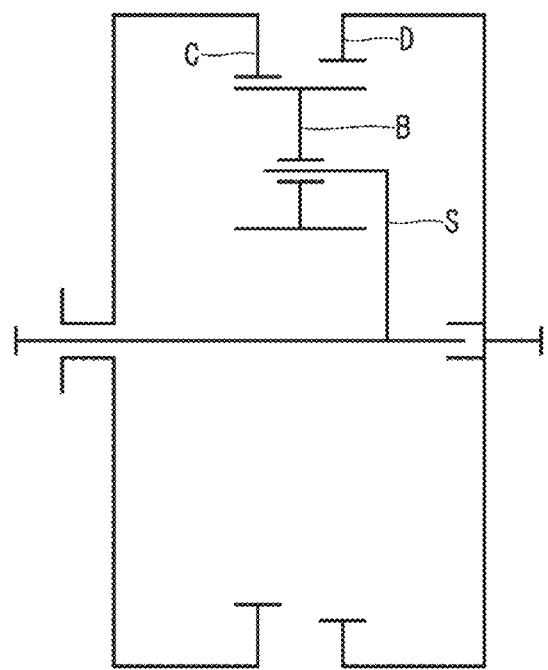
FIG. 3 is a schematic diagram of a 2kh-type strange planetary gear speed reducer, and a table showing a relationship among an input and output pattern, an inertia moment, and a speed reduction ratio.
Figure 4:
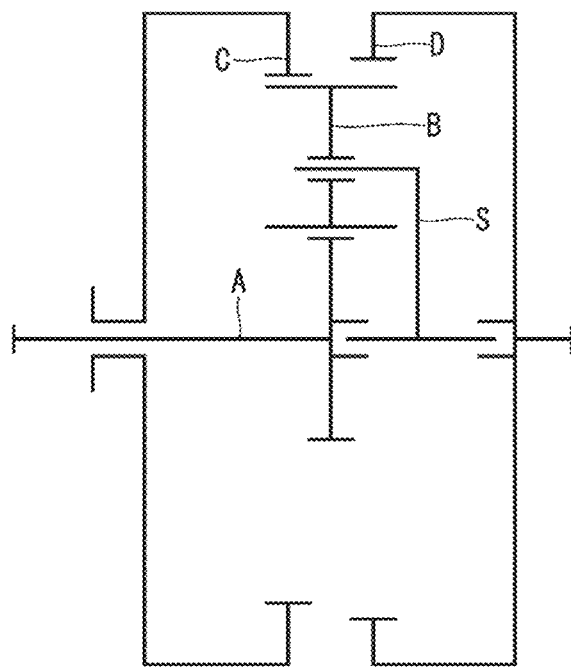
FIG. 4 is a schematic diagram of a 3k-type strange planetary gear speed reducer, and a table showing a relationship among an input and output pattern, an inertia moment, and a speed reduction ratio.

An upper part in FIG. 3 shows a schematic diagram of a 2kh-type strange planetary gear speed reducer. An upper part in FIG. 4 shows a schematic diagram of the 3k-type strange planetary gear speed reducer. The sun gear is denoted by A. The planetary gear is denoted by B. The first ring gear is denoted by C. The second ring gear is denoted by D. The carrier is denoted by S. Comparing the 2kh-type and the 3k-type, the 3k-type has a configuration in which the sun gear A is added to the 2kh-type.

In the case of the 2kh-type, the inertia moment around the input shaft is smallest when the carrier S located on a radially innermost side among constituent elements is used as an input element (see a table in a lower part of FIG. 3).

On the other hand, in the case of the 3kh-type, the inertia moment around the input shaft is smallest when the sun gear A located on the radially innermost side among the constituent elements is used as the input element (see a table in a lower part of FIG. 4).

A magnitude of the inertia moment is larger in the case where the carrier S is used as the input element in the 2kh-type than in the case where the sun gear A is used as the input element in the 3kh-type. Therefore, in the electric clutch device in which the speed of the initial response is required, when a strange planetary gear reducer is adopted as the speed reducer, it is desirable to use the 3k-type and use the sun gear A as the input element.

Further, in the electric clutch device, the required load is as large as several thousands to several tens of thousands N, and in order to achieve both a high response and a high load, it is necessary to increase a speed reduction ratio of the speed reducer. When maximum speed reduction ratios of the 2kh-type and the 3k-type are compared with each other in the same gear specification, the maximum speed reduction ratio of the 3k-type is large than and is about twice the maximum speed reduction ratio of the 2kh-type. In the case of the 3k-type, a large speed reduction ratio can be obtained when the sun gear A having the smallest inertia moment is used as an input element (see the table in the lower part of FIG. 4). Therefore, it can be said that an optimal configuration for achieving both high response and high load is a configuration in which the 3k-type is used and the sun gear A is used as the input element.

In the present embodiment, the speed reducer 30 is a 3k-type strange planetary gear speed reducer having the sun gear 31 (A) as the input element, the second ring gear 35 (D) as an output element, and the first ring gear 34 (C) as a fixing element. Therefore, the inertia moment around the sun gear 31 can be reduced, and the speed reduction ratio of the speed reducer 30 can be increased. It is possible to achieve both high response and high load in the clutch device 1.

Next, an effect of the state changing unit 80 having the disk spring 81 as the elastic deformation portion will be described.

Figure 5:
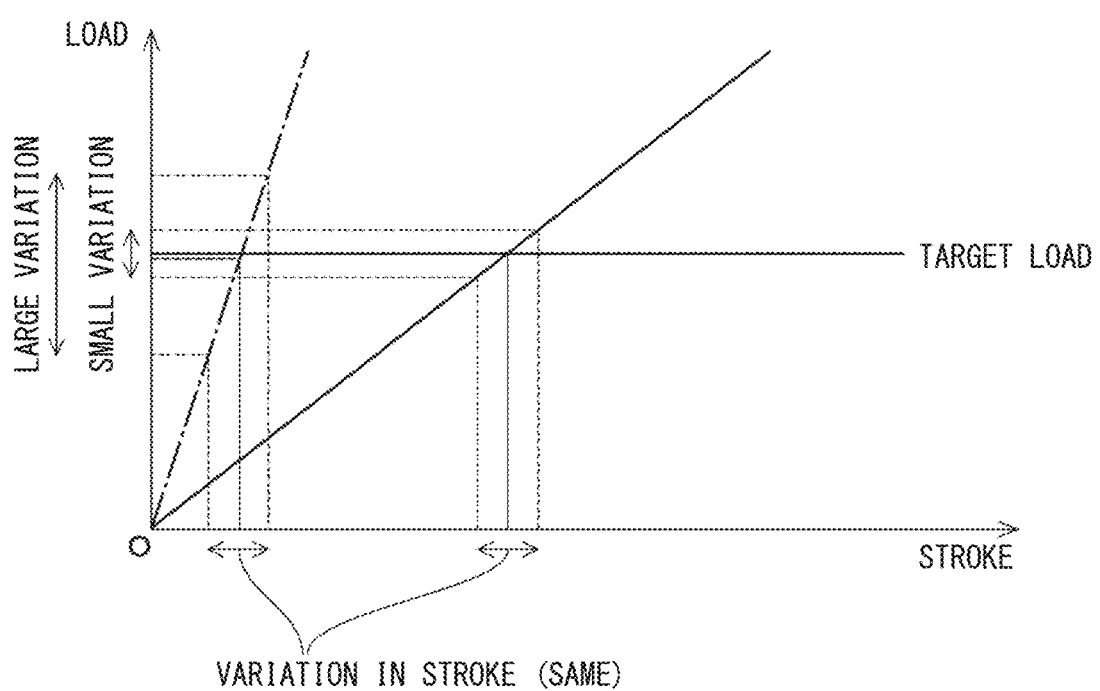
FIG. 5 is a diagram showing a relationship between a stroke of a translation portion and a load acting on a clutch.

As shown in FIG. 5, with respect to a relationship between the movement of the driven cam 50 in the axial direction, that is, a stroke and a load acting on the clutch 70, when comparing a configuration in which the clutch 70 is pushed by a rigid body that is difficult to elastically deform in the axial direction (see an alternate long and short dash line in FIG. 5) and a configuration in which the clutch 70 is pushed by the disk spring 81 that is elastically deformable in the axial direction as in the present embodiment (see a solid line in FIG. 5), it can be seen that, when variations in the stroke are the same, a variation in the load acting on the clutch 70 is smaller in the configuration in which the clutch 70 is pushed by the disk spring 81 than that in the configuration in which the clutch 70 is pushed by the rigid body. This is because, as compared with the configuration in which the clutch 70 is pushed by the rigid body, a combined spring constant can be reduced by using the disk spring 81, so that the variation in the load with respect to the variation in the stroke of the driven cam 50 caused by the actuator can be reduced. In the present embodiment, since the state changing unit 80 includes the disk spring 81 as the elastic deformation portion, the variation in the load with respect to the variation in the stroke of the driven cam 50 can be reduced, and a target load can be easily applied to the clutch 70.

Hereinafter, the configuration of each portion according to the present embodiment will be described in more detail.

Figure 6:
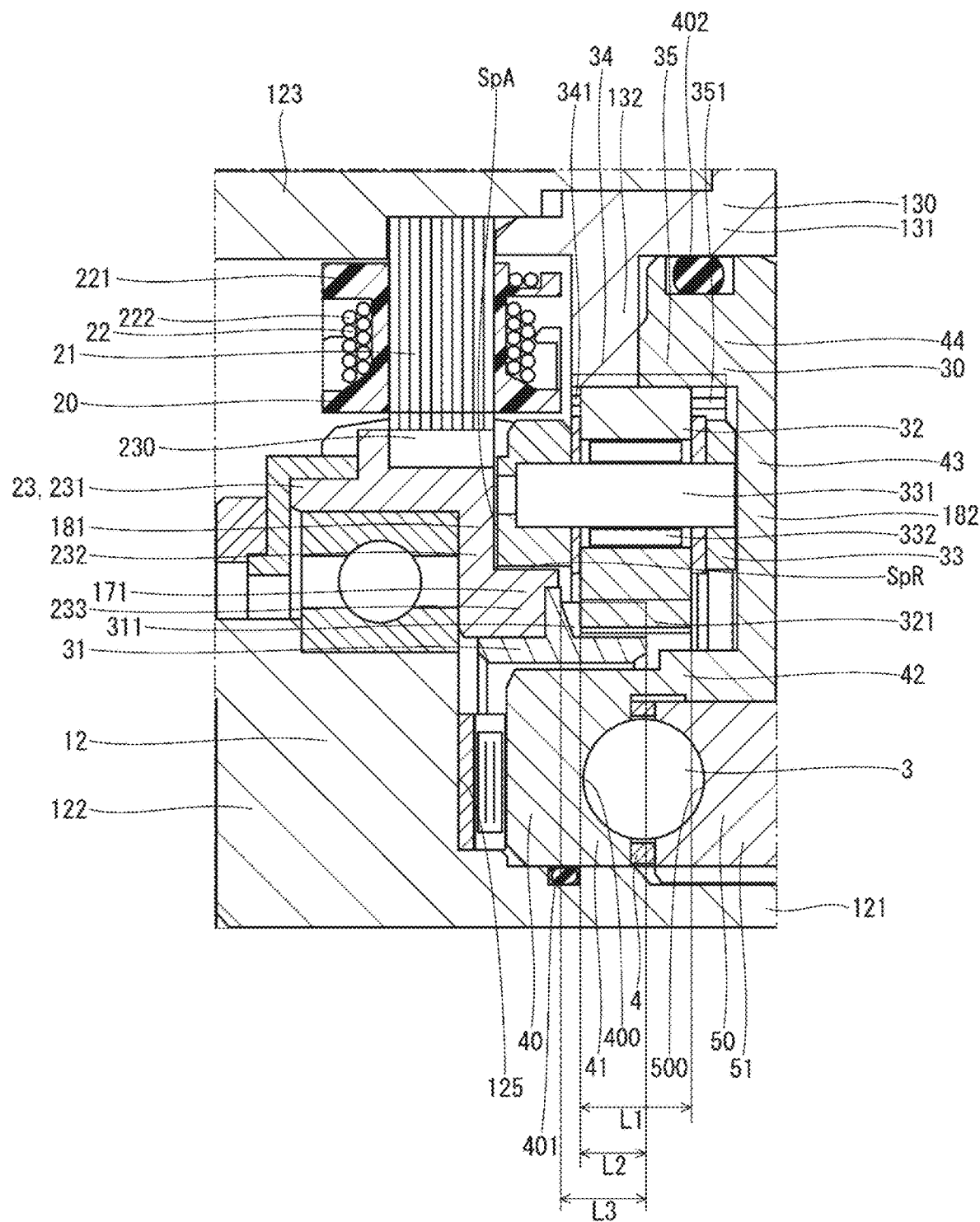
FIG. 6 is a cross-sectional view showing a sun gear and a vicinity thereof in the clutch device according to the first embodiment.

As shown in FIG. 6, in the present embodiment, a gear width L3, which is a length in the axial direction of the sun gear tooth portion 311 of the sun gear 31, is set such that a meshing length L2 between the sun gear 31 and the planetary gear 32, which is a length in the axial direction by which the sun gear tooth portion 311 and the planetary gear tooth portion 321 overlap, i.e. mesh with each other, is smaller than a gear width L1, which is a length in the axial direction of the planetary gear tooth portion 321 of the planetary gear 32. That is, the sun gear 31 is provided and formed such that the meshing length L2 between the sun gear 31 and the planetary gear 32 is smaller than the gear width L1 of the planetary gear 32.

In the present embodiment, the gear width L3 of the sun gear 31 is smaller than the gear width L1 of the planetary gear 32. Therefore, regardless of the positions of the sun gear 31 and the planetary gear 32 in the axial direction of the sun gear 31, the meshing length L2 between the sun gear 31 and the planetary gear 32 is smaller than the gear width L1 of the planetary gear 32.

In the present embodiment, the meshing length L2 between the sun gear 31 and the planetary gear 32 is set to about 50% of the gear width L1 of the planetary gear 32. The meshing length L2 between the sun gear 31 and the planetary gear 32 is preferably set to 20% to 50% of the gear width L1 of the planetary gear 32.

Hereinafter, a more detailed configuration, operation, and the like will be described.

Figure 7:
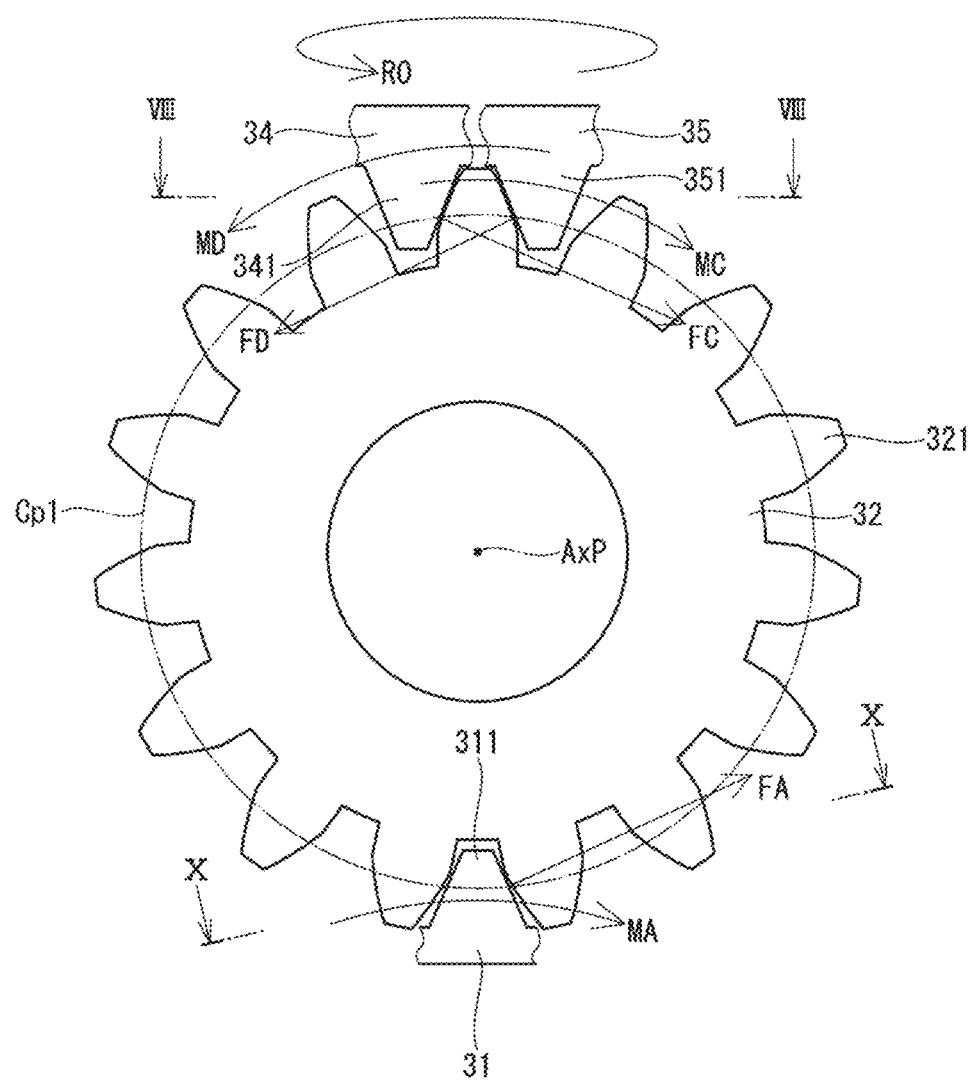
FIG. 7 is a diagram of the planetary gear of the clutch device according to the first embodiment as viewed in an axial direction.

As shown in FIG. 7, when torque MA is applied to the sun gear 31 in a state where load torque MD is applied to the second ring gear 35, a moment generated around an axis A×P of the planetary gear 32 is zero due to three forces including a force FD acting on the planetary gear 32 by the load torque MD of the second ring gear 35, a force FA acting on the planetary gear 32 by the torque MA, and a force FC acting on the planetary gear 32 by load torque MC of the first ring gear 34, and a balance of the planetary gear 32 is maintained.

Figure 8:
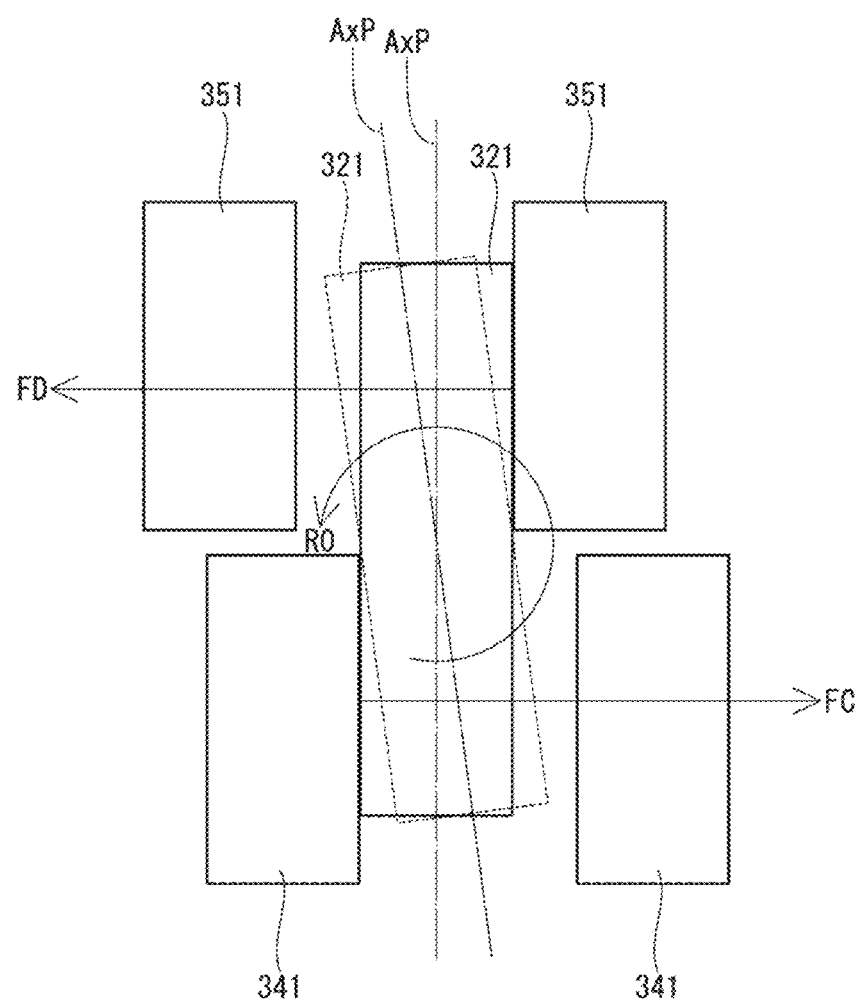
FIG. 8 is a cross-sectional view taken along a line VIII-VIII in FIG. 7.

As shown in FIGS. 7 and 8, the force FC and the force FD acting on the planetary gear tooth portion 321 are in a twisted relationship. Therefore, in a range of a gap between the planetary gear tooth portion 321 and the first ring gear tooth portion 341 and a gap between the planetary gear tooth portion 321 and the second ring gear tooth portion 351, a moment is generated to rotate the planetary gear 32 in a direction R0 in which the axis A×P is inclined. Accordingly, the planetary gear 32 may rotate with respect to the carrier 33 such that the axis A×P is inclined.

Figure 9:
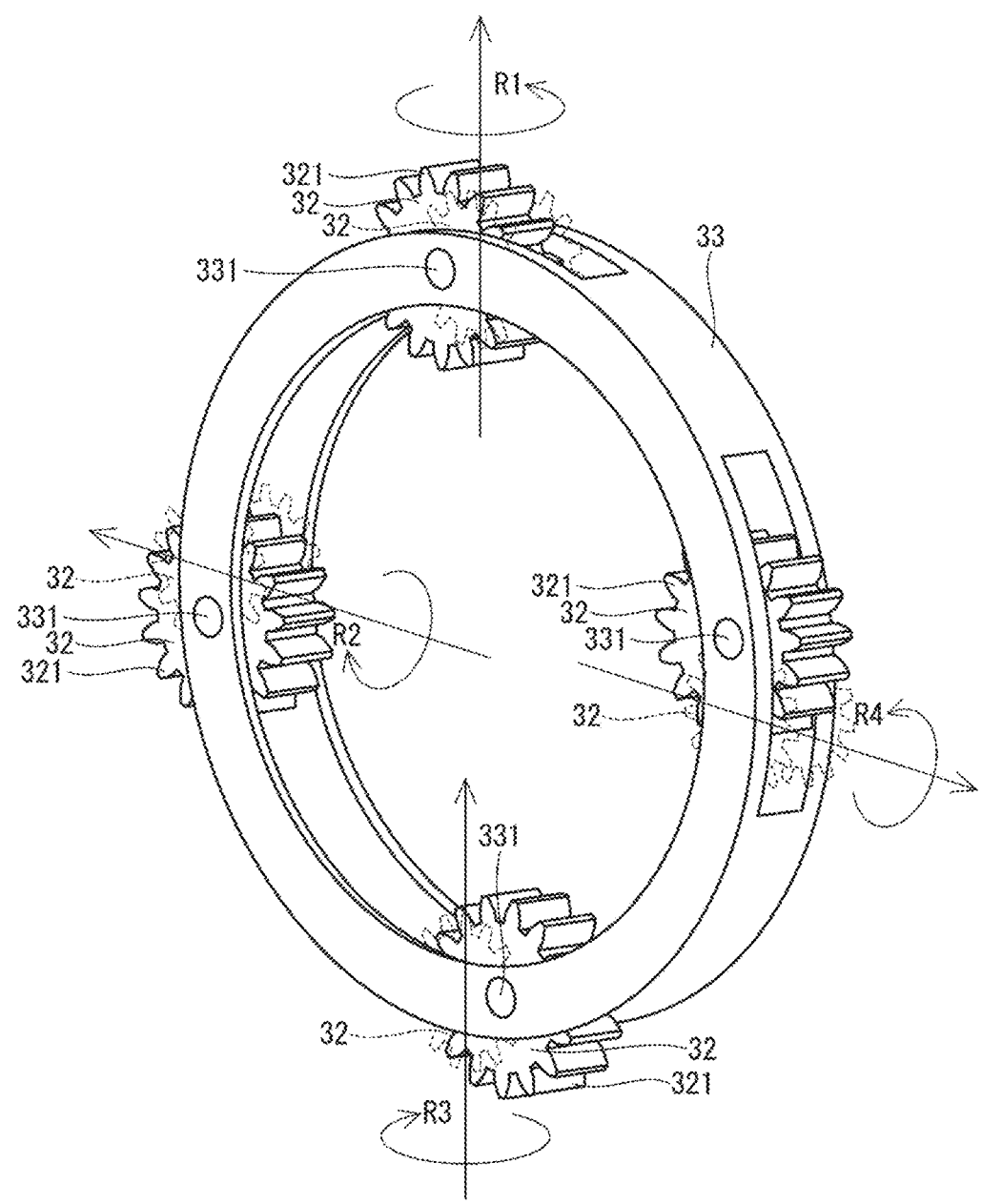
FIG. 9 is a perspective view showing a carrier and the planetary gears of the clutch device according to the first embodiment.

The carrier 33 may rotate in a direction R1, a direction R2, a direction R3, a direction R4, and the like (see FIG. 9) due to, for example, an axial gap SpA which is a gap in the axial direction between the carrier 33 and the rotor 23 which is another member and a radial gap SpR which is a gap in the radial direction (see FIG. 6). The rotation is added to the rotation of the planetary gears 32 in the direction R0, and the planetary gears 32 may rotate and incline greatly with respect to members other than the carrier 33 (see dashed lines in FIG. 9).

When the planetary gears 32 are inclined with respect to the sun gear 31, the clearance formed between the sun gear tooth portion 311 of the sun gear 31 and the planetary gear tooth portion 321 of the planetary gear 32 before the inclination is reduced by an amount proportional to the meshing width and the inclination angle between the sun gear 31 and the planetary gear 32. When the clearance is zero, a so-called double-tooth meshing phenomenon occurs between the sun gear 31 and the planetary gear 32.

Figure 10:
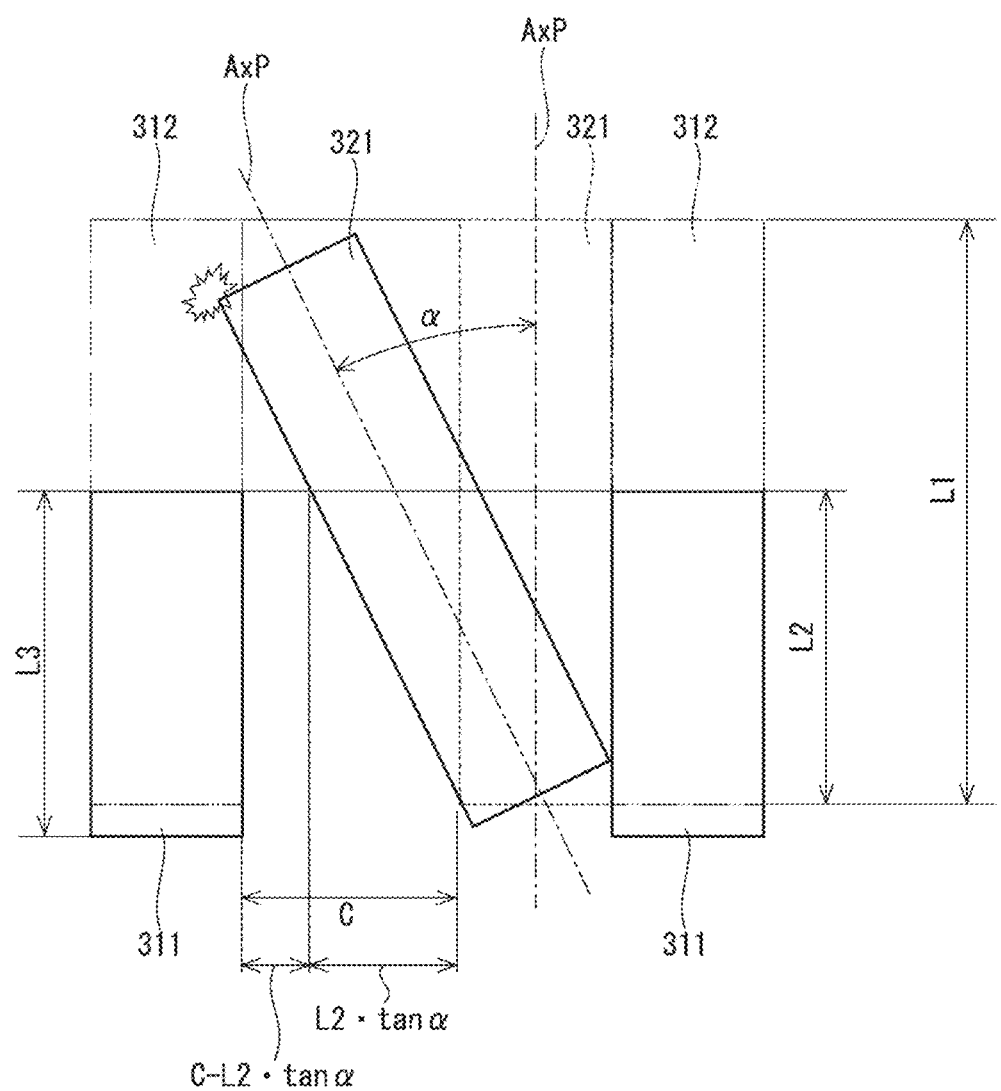
FIG. 10 is a cross-sectional view taken along a line X-X in FIG. 7.

As shown in FIG. 10, in the present embodiment, the sun gear 31 and the planetary gear 32 are formed such that $C-L2 \cdot \tan \alpha \geq 0$ and $L1 > L2$, wherein C is a backlash in a circumferential direction on a meshing pitch circle Cp1 between the sun gear 31 and the planetary gear 32 when the inclination angle of the planetary gears 32 with respect to the sun gear 31 is 0, $\alpha$ is an inclination angle of the planetary gear 32 with respect to the sun gear 31, L1 is a gear width of the planetary gear 32, and L2 is a meshing length between the sun gear 31 and the planetary gear 32. That is, in the present embodiment, C, $\alpha$, L1, and L2 are set such that $C-L2 \cdot \tan \alpha \geq 0$ and $L1 > L2$.

Figure 11:
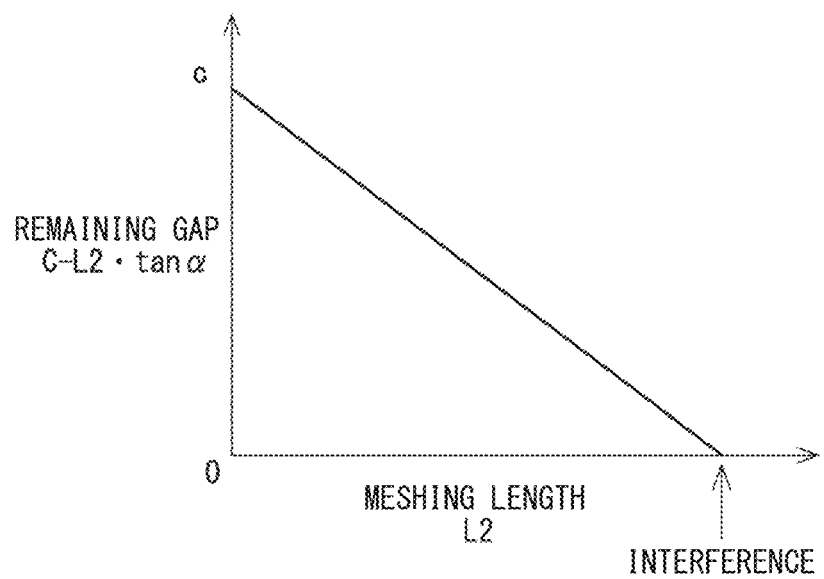
FIG. 11 is a diagram showing a relationship between a meshing length between the sun gear and the planetary gear and a remaining gap between a tooth portion of the sun gear and a tooth portion of the planetary gear.

As shown in FIG. 11, $C-L2 \cdot \tan \alpha$, which is a remaining gap between the sun gear tooth portion 311 and the planetary gear tooth portion 321 when the inclination angle of the planetary gear 32 with respect to the sun gear 31 is a, decreases as the meshing length L2 between the sun gear 31 and the planetary gear 32 increases. When the remaining gap $C-L2 \cdot \tan \alpha$ is 0, the sun gear tooth portion 311 and the planetary gear tooth portion 321 interfere with each other. That is, a condition of occurrence of interference is $C-L2 \cdot \tan \alpha < 0$.

In FIG. 10, the sun gear tooth portion 312 in a comparative example is indicated by a two-dot chain line. A gear width and a meshing length with the planetary gear 32 of the sun gear tooth portion 312 are L1, that is, the same as the gear width L1 of the planetary gear 32. In the case of the comparative embodiment, even if the inclination angle $\alpha$ of the planetary gear 32 with respect to the sun gear 31 is relatively small, both ends of the planetary gear tooth portion 321 in the axis A×P direction come into contact with the adjacent sun gear tooth portions 312, and the double-tooth meshing phenomenon occurs (see FIG. 10).

On the other hand, as described above, the sun gear 31 and the planetary gear 32 according to the present embodiment are formed such that $C-L2 \cdot \tan \alpha \geq 0$ and $L1 > L2$. Therefore, when the inclination angle $\alpha$ of the planetary gear 32 with respect to the sun gear 31 is about the same as that in the example of the comparative embodiment, both ends of the planetary gear tooth portion 321 in the axis A×P direction do not come into contact with the adjacent sun gear tooth portions 311, and the occurrence of the double-tooth meshing phenomenon can be prevented.

In the comparative embodiment, in order to prevent the interference between the sun gear tooth portion 312 and the planetary gear tooth portion 321, countermeasures such as (1) "reduce a" and (2) "reduce tooth thicknesses of the sun gear tooth portion 311 and the planetary gear tooth portion 321" are considered.

(1) In order to "reduce a", it is conceivable to reduce the axial gap SpA and the radial gap SpR between the carrier 33 and the rotor 23. However, in this case, it is necessary to improve processing accuracy of the members, which may lead to an increase in cost.

(2) "Reducing the tooth thicknesses of the sun gear tooth portion 311 and the planetary gear tooth portion 321" may cause performance disadvantages such as a reduction in bending strength of a tooth root and an increase in backlash and tooth hitting noise.

On the other hand, in the present embodiment, the sun gear 31 and the planetary gear 32 are formed such that the meshing length L2 between the sun gear 31 and the planetary gear 32 is smaller than the gear width L1 of the planetary gear 32, that is, $L1 > L2$. Therefore, the interference between the sun gear tooth portion 311 and the planetary gear tooth portion 321 can be prevented without causing the above-described problems of the countermeasures (1) and (2).

In the present embodiment, although a contact area between the sun gear tooth portion 311 and the planetary gear tooth portion 321 may be reduced and surface pressure may be increased by setting $L1 > L2$, a 3k-type strange planetary gear speed reducer is employed, and the torque applied to the sun gear 31 is small, so that there is no problem in strength even if the meshing length L2 is reduced to half, that is, about 50% of the gear width L1 of the planetary gear 32.

The motor 20 includes the magnet 230 as the "permanent magnet" provided in the rotor 23 (see FIG. 6). The magnet 230 is provided on the outer peripheral wall of the rotor 23. That is, the motor 20 is a surface magnet type (SPM) motor.

In the present embodiment, the clutch device 1 includes an oil supply portion (not shown). The oil supply portion is formed in a passage shape in the output shaft 62 such that one end of the oil supply portion 5 is exposed to the clutch space 620. The other end of the oil supply portion is connected to an oil supply source (not shown). Accordingly, oil is supplied from one end of the oil supply portion to the clutch 70 in the clutch space 620.

The ECU 10 controls an amount of oil to be supplied from the oil supply portion to the clutch 70. The oil supplied to the clutch 70 can lubricate and cool the clutch 70. In the present embodiment, the clutch 70 is a wet clutch and can be cooled by oil.

In the present embodiment, the ball cam 2 as the "rotational translation unit" forms the accommodation space 120 between the drive cam 40 as the "rotation portion" and the housing 12. The accommodation space 120 is formed inside the housing 12 on a side opposite to the clutch 70 with respect to the drive cam 40. The motor 20 and the speed reducer 30 are provided in the accommodation space 120.

The clutch 70 is provided in the clutch space 620, which is a space opposite to the accommodation space 120 with respect to the drive cam 40.

In the present embodiment, the clutch device 1 includes an inner sealing member 401 and an outer sealing member 402 as "seal members". The inner sealing member 401 and the outer sealing member 402 are formed in an annular shape using an elastic material such as rubber.

The inner sealing member 401 and the outer sealing member 402 are so-called O-rings. An inner diameter and an outer diameter of the inner sealing member 401 are smaller than an inner diameter and an outer diameter of the outer sealing member 402.

The inner sealing member 401 is provided in an annular seal groove portion 128 formed in the outer peripheral wall of the housing inner cylinder portion 121 between the housing-side spline groove portion 127 and the housing step surface 125. The outer sealing member 402 is provided in an annular seal groove portion 441 formed in the outer peripheral wall of the drive cam outer cylinder portion 44. That is, the outer sealing member 402 is provided so as to be in contact with the drive cam 40 on the radially outer side of the drive cam 40 as the "rotation portion".

The inner peripheral wall of the drive cam main body 41 is slidable with respect to an outer edge portion of the inner sealing member 401. That is, the inner sealing member 401 is provided so as to be in contact with the drive cam 40 on the radially inner side of the drive cam 40 as the "rotation portion". The inner sealing member 401 seals the housing inner cylinder portion 121 and the inner peripheral wall of the drive cam main body 41 in an airtight or liquid-tight manner while being elastically deformed in the radial direction.

The outer sealing member 402 is provided so as to be located on the radially outer side of the inner sealing member 401 when viewed in the axial direction of the inner sealing member 401 (see FIGS. 1 and 2).

The inner peripheral wall of the fixing cylinder portion 131 is slidable with respect to an outer edge portion of the outer sealing member 402. That is, the outer sealing member 402 is provided so as to be in contact with the fixing cylinder portion 131 of the fixing portion 130. The outer sealing member 402 seals the drive cam outer cylinder portion 44 and the inner peripheral wall of the fixing cylinder portion 131 in an airtight or liquid-tight manner while being elastically deformed in the radial direction.

By the inner sealing member 401 and the outer sealing member 402 provided as described above, an airtight or liquid-tight state can be maintained between the accommodation space 120 in which the motor 20 and the speed reducer 30 are accommodated and the clutch space 620 in which the clutch 70 is provided. Accordingly, for example, even if a foreign matter such as the abrasion powder is generated in the clutch 70, the foreign matter can be prevented from entering the accommodation space 120 from the clutch space 620. Therefore, operation failure of the motor 20 or the speed reducer 30 caused by the foreign matter can be prevented.

In the present embodiment, since the airtight or liquid-tight state is maintained between the accommodation space 120 and the clutch space 620 by the inner sealing member 401 and the outer sealing member 402, even if the foreign matter such as abrasion powder is contained in the oil supplied to the clutch 70, the oil containing the foreign matter can be prevented from flowing from the clutch space 620 into the accommodation space 120.

In the present embodiment, the housing 12 is formed in a closed shape from a portion corresponding to the radially outer side of the outer sealing member 402 to a portion corresponding to the radially inner side of the inner sealing member 401 (see FIGS. 1 and 2).

In the present embodiment, the drive cam 40 that forms the accommodation space 120 with the housing 12 rotates relatively with respect to the housing 12, but does not move with respect to the housing 12 in the axial direction. Therefore, during an operation of the clutch device 1, a change in a volume of the accommodation space 120 can be prevented, and generation of negative pressure in the accommodation space 120 can be prevented. Accordingly, oil or the like containing the foreign matter can be prevented from being suctioned into the accommodation space 120 from the clutch space 620 side.

The inner sealing member 401 in contact with the inner edge portion of the drive cam 40 slides with respect to the drive cam 40 in the circumferential direction, but does not slide in the axial direction. The outer sealing member 402 that is in contact with the inner peripheral wall of the fixing cylinder portion 131 of the fixing portion 130 slides with respect to the fixing portion 130 in the circumferential direction, but does not slide in the axial direction.

As shown in FIG. 1, the drive cam main body 41 is located on a side opposite to the clutch 70 with respect to a surface of the drive cam outer cylinder portion 44 on the side opposite to the clutch 70. That is, the drive cam 40 as the "rotation portion" is bent in the axial direction so as to be formed such that the drive cam main body 41, which is the inner edge portion of the drive cam 40, and the drive cam outer cylinder portion 44, which is the outer edge portion of the drive cam 40, are formed at different positions in the axial direction.

The driven cam main body 51 is provided so as to be located on a clutch 70 side of the drive cam main body 41 and on the radially inner side of the drive cam inner cylinder portion 42. That is, the drive cam 40 and the driven cam 50 are provided in a nested manner in the axial direction.

More specifically, the driven cam main body 51 is located on the radially inner side of the drive cam outer cylinder portion 44, the second ring gear 35, and the drive cam inner cylinder portion 42. The sun gear tooth portion 311 of the sun gear 31, the carrier 33, and the planetary gears 32 are located on the radially outer side of the drive cam main body 41 and the driven cam main body 51. Accordingly, a size in the axial direction of the clutch device 1 including the speed reducer 30 and the ball cam 2 can be significantly reduced.

In the present embodiment, as shown in FIG. 1, in the axial direction of the drive cam main body 41, the drive cam main body 41, the sun gear 31, the carrier 33, and the bobbin 221 and the winding 222 of the coil 22 are disposed so as to partially overlap each other. In other words, the coil 22 is provided such that a part of the coil 22 is located on the radially outer side of a part of the drive cam main body 41, the sun gear 31, and the carrier 33 in the axial direction. Accordingly, the size of the clutch device 1 in the axial direction can be further reduced.

In the present embodiment, the clutch device 1 includes a thrust bearing 161 and a thrust bearing washer 162. The thrust bearing washer 162 is formed of, for example, metal in a substantially circular-annular plate shape, and is provided such that one surface thereof is in contact with the housing step surface 125. The thrust bearing 161 is provided between the other surface of the thrust bearing washer 162 and a surface of the drive cam main body 41 opposite to the driven cam 50. The thrust bearing 161 bearing-supports the drive cam 40 while receiving a load in the thrust direction from the drive cam 40. In the present embodiment, the load in the thrust direction acting on the drive cam 40 from the clutch 70 side via the driven cam 50 acts on the housing step surface 125 via the thrust bearing 161 and the thrust bearing washer 162. Therefore, the drive cam 40 can be stably bearing-supported by the housing step surface 125.

As described above, in the present embodiment, the gear width L3 of the sun gear 31 is set such that the meshing length L2 between the sun gear 31 and the planetary gear 32 is smaller than the gear width L1 of the planetary gear 32. Therefore, even if the planetary gear 32 is inclined with respect to the sun gear 31, the gap in the circumferential direction on the meshing pitch circle Cp1 between the sun gear 31 and the planetary gear 32 can be secured, and occurrence of the double-tooth meshing phenomenon between the sun gear 31 and the planetary gear 32 can be prevented. Therefore, the speed reducer 30 can be maintained operating well.

In the present embodiment, the meshing length L2 between the sun gear 31 and the planetary gear 32 is set to about 50% of the gear width L1 of the planetary gear 32.

Therefore, the meshing length L2 between the sun gear 31 and the planetary gear 32 can be reliably set to be smaller than the gear width L1 of the planetary gear 32. In the present embodiment, the 3k-type strange planetary gear speed reducer is employed, and the torque applied to the sun gear 31 is small, so that there is no problem in strength even if the meshing length L2 is about 50% of the gear width L1 of the planetary gear 32.

In the present embodiment, the sun gear 31 and the planetary gear 32 are formed such that C−L2·tan α≥0 and L1>L2, wherein C is the backlash in the circumferential direction on the meshing pitch circle Cp1 between the sun gear 31 and the planetary gear 32 when the inclination angle of the planetary gear 32 with respect to the sun gear 31 is 0, α is the inclination angle of the planetary gear 32 with respect to the sun gear 31, L1 is the gear width of the planetary gear 32, and L2 is the meshing length between the sun gear 31 and the planetary gear 32.

Therefore, the occurrence of the double-tooth meshing phenomenon between the sun gear 31 and the planetary gear 32 can be reliably prevented.

In the present embodiment, the motor 20 includes the magnet 230 provided in the rotor 23. That is, the motor 20 is a brushless DC motor using the magnet 230 as the "permanent magnet".

In the present embodiment, the inner sealing member 401 and the outer sealing member 402 can maintain a liquid-tight state between the accommodation space 120 and the clutch space 620. Accordingly, even if magnetic particles such as iron powder are contained in the oil supplied to the clutch 70 for cooling the clutch 70, it is possible to prevent the oil containing the magnetic particles from flowing from the clutch space 620 into the accommodation space 120. Therefore, the magnetic particles can be prevented from being absorbed to the magnet 230 of the motor 20, and the decrease in the rotation performance of the motor 20 and the operation failure can be prevented.

In the present embodiment, the speed reducer 30 includes the carrier 33, the first ring gear 34, and the second ring gear 35.

The carrier 33 rotatably supports the planetary gears 32 and is rotatable relatively with respect to the sun gear 31. The first ring gear 34 can mesh with the planetary gears 32. The second ring gear 35 is formed so as to be capable of meshing with the planetary gears 32 and such that the number of teeth of the tooth portion of the second ring gear 35 is different from that of the first ring gear 34, and outputs torque to the drive cam 40 of the ball cam 2.

In the present embodiment, the speed reducer 30 corresponds to a configuration of a number of strange planetary gear reducers and a configuration of a highest response and a highest load among the input and output patterns. Therefore, both high response and high load of the speed reducer 30 can be achieved.

In the present embodiment, as described above, the inner sealing member 401 and the outer sealing member 402 can maintain a liquid-tight state between the accommodation space 120 and the clutch space 620. Accordingly, it is possible to reduce the influence of oil containing fine iron powder on the speed reducer 30 as the "strange planetary gear reducer" having many meshing portions, for example, damage, wear, a decrease in principle efficiency, and the like.

In the present embodiment, the first ring gear 34 is fixed to the housing 12. The second ring gear 35 is provided so as to be integrally rotatable with the drive cam 40.

In the present embodiment, responsiveness of the clutch device 1 can be improved by connecting the components, as described above, such that the inertia moment of a high-speed rotation portion of the speed reducer 30 as the "strange planetary gear speed reducer" is reduced.

In the present embodiment, the drive cam 40 is formed integrally with the second ring gear 35. Therefore, the number of members and the number of assembling steps can be reduced, and further cost reduction can be achieved.

In the present embodiment, the "rotation portion" of the "rotational translation unit" is the drive cam 40 having the multiple drive cam grooves 400 formed on one surface in the axial direction. The "translation portion" is the driven cam 50 having the multiple driven cam grooves 500 formed on one surface in the axial direction. The "rotational translation unit" is the ball cam 2 including the drive cam 40, the driven cam 50, and the balls 3 each provided so as to be rollable between the drive cam groove 400 and the driven cam groove 500.

Therefore, the efficiency of the "rotational translation unit" can be improved as compared with a case where the "rotational translation unit" is configured by, for example, a "sliding screw". As compared with a case where the "rotational translation unit" is configured by, for example, a "ball screw", it is possible to reduce the cost, to reduce the size of the "rotational translation unit" in the axial direction, and to further reduce the size of the clutch device.

In the present embodiment, the drive cam 40 as the "rotation portion" is formed such that the drive cam main body 41, which is the inner edge portion, and the drive cam outer cylinder portion 44, which is the outer edge portion, are located at different positions in the axial direction.

Therefore, the drive cam 40, the driven cam 50 as the "translation portion", and the speed reducer 30 can be disposed in a nested manner in the axial direction, and the size of the clutch device 1 in the axial direction can be reduced.

In the present embodiment, the motor 20 and the speed reducer 30 are provided in the accommodation space 120 formed inside the housing 12 on the side opposite to the clutch 70 with respect to the drive cam 40. The clutch 70 is provided in the clutch space 620, which is a space opposite to the accommodation space 120 with respect to the drive cam 40.

The inner sealing member 401 and the outer sealing member 402 as the "sealing members" are each formed in an annular shape, are provided so as to be in contact with the drive cam 40 as the "rotation portion", and can maintain an airtight or liquid-tight state between the accommodation space 120 and the clutch space 620.

Accordingly, for example, even if a foreign matter such as the abrasion powder is generated in the clutch 70, the foreign matter can be prevented from entering the accommodation space 120 from the clutch space 620. Therefore, operation failure of the motor 20 or the speed reducer 30 caused by the foreign matter can be prevented. Therefore, the operation failure of the clutch device 1 caused by foreign matter can be prevented.

In the present embodiment, the inner sealing member 401 and the outer sealing member 402 as the "sealing members" are disposed so as to be in contact with the drive cam 40 as the "rotation portion", and maintain the airtight or liquid-tight state between the accommodation space 120 and the clutch space 620. Therefore, oil or the like containing fine iron powder or the like can be prevented from entering the accommodation space 120 accommodating the motor 20 and the speed reducer 30, and a good performance of the clutch device 1 can be maintained for a long period of time.

In the present embodiment, the inner sealing member 401 and the outer sealing member 402 are provided so as to be in contact with the drive cam 40, which is a component that is reduced by the speed reducer 30 and amplified to a large drive torque. Therefore, a ratio of a loss torque associated with the sealing performed by the "sealing members" to the whole torque reduces, which is advantageous in terms of efficiency. In a case where the "sealing members" are provided so as to be in contact with the rotor 23 which is a component on the input side of the speed reducer 30, the loss torque due to the "sealing members" is lost with respect to small drive torque, and thus the efficiency may be significantly reduced.

In the present embodiment, in a flow path of a power, an upstream side of the drive cam 40 is set as the accommodation space 120, and the accommodation space 120 is sealed by the inner sealing member 401 and the outer sealing member 402. The inner sealing member 401 and the outer sealing member 402 rotate relatively with respect to the housing 12 together with the drive cam 40, but do not move with respect to the housing 12 in the axial direction. Therefore, even when the drive cam 40 rotates, the volume of the accommodation space 120 does not change. Accordingly, there is no influence in the change in a spatial volume caused by a translational motion of the driven cam 50 as the "translation portion", and a special volume change absorbing means such as a bellows-shaped sealing member described in, for example, US Patent Application Publication No. 2015/0144453 is not necessary.

In the present embodiment, the inner sealing member 401 and the outer sealing member 402 as the "sealing members" are O-rings.

Therefore, the configuration of the clutch device 1 can be simplified and reduced in cost.

In the present embodiment, the state changing unit 80 includes the disk spring 81 as the "elastic deformation portion" that is elastically deformable in the axial direction of the driven cam 50 as the "translation portion".

By controlling a rotation angle position of the motor 20, thrust control of the clutch 70 can be performed with high accuracy based on the displacement and load characteristics of the disk spring 81. Therefore, the variation in the load acting on the clutch 70 with respect to the variation in the stroke of the driven cam 50 can be reduced. Accordingly, the load control can be performed with high accuracy, and the clutch device 1 can be controlled with high accuracy.

Second Embodiment

Figure 12:
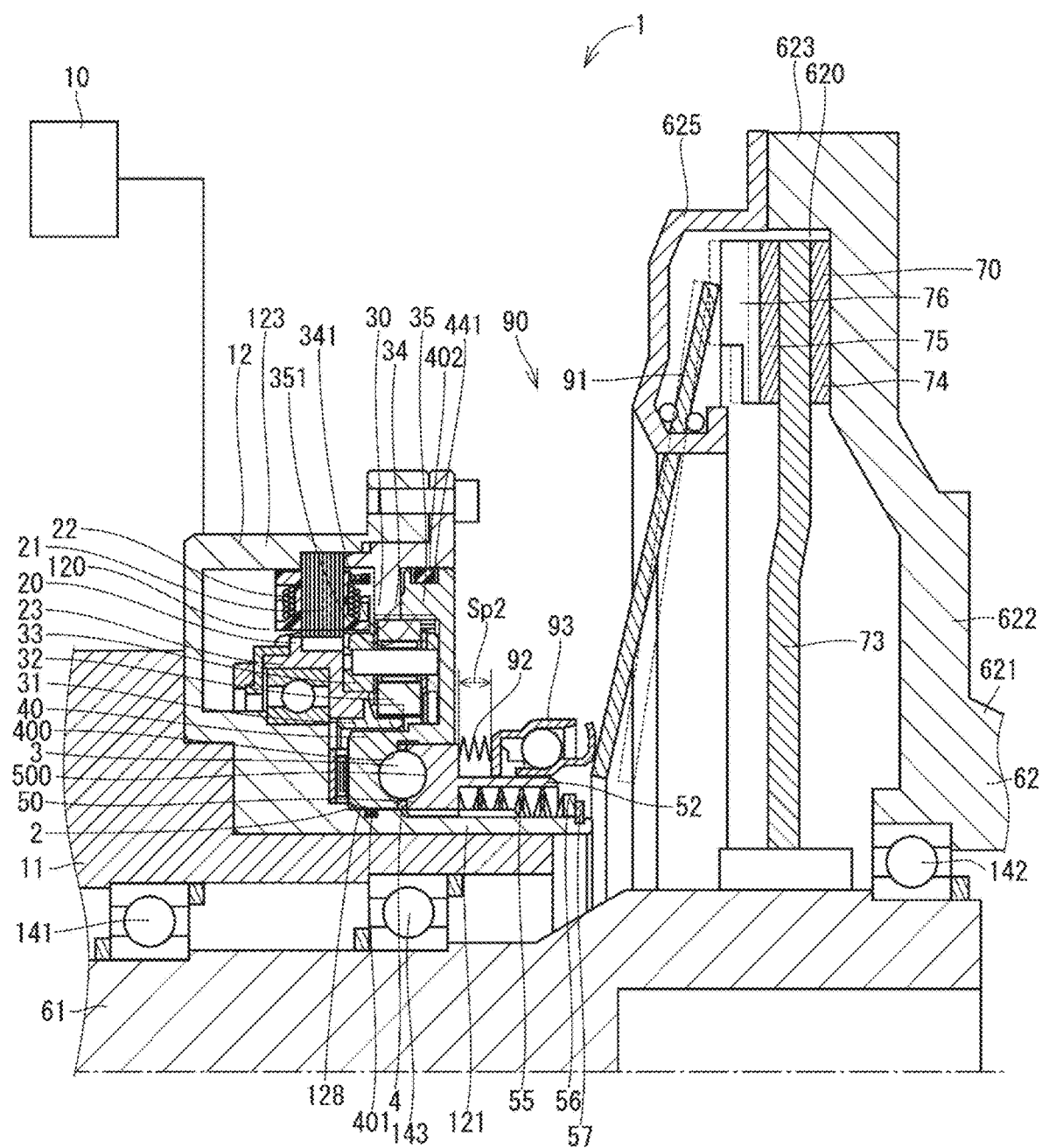
FIG. 12 is a cross-sectional view showing a clutch device according to a second embodiment.

A clutch device according to a second embodiment is shown in FIG. 12. The second embodiment is different from the first embodiment in configurations of the clutch and the state changing unit.

In the present embodiment, ball bearings 141 and 143 are provided between the inner peripheral wall of the fixing flange 11 and the outer peripheral wall of the input shaft 61. Accordingly, the input shaft 61 is bearing-supported by the fixing flange 11 via the ball bearings 141 and 143.

The housing 12 is fixed to the fixing flange 11 such that a part of an outer wall of the housing 12 is in contact with the wall surface of the fixing flange 11, and an inner peripheral wall of the housing inner cylinder portion 121 is in contact with an outer peripheral wall of the fixing flange 11. The housing 12 is fixed to the fixing flange 11 by a bolt or the like (not shown). The housing 12 is provided coaxially with the fixing flange 11 and the input shaft 61.

The arrangement of the motor 20, the speed reducer 30, the ball cam 2, and the like with respect to the housing 12 is the same as that of the first embodiment.

In the present embodiment, the output shaft 62 includes the shaft portion 621, the plate portion 622, the cylinder portion 623, and a cover 625. The shaft portion 621 is formed in a substantially cylindrical shape. The plate portion 622 is integrally formed with the shaft portion 621 so as to extend radially outward from one end of the shaft portion 621 in an annular plate shape. The cylinder portion 623 is integrally formed with the plate portion 622 so as to extend in a substantially cylindrical shape from an outer edge portion of the plate portion 622 toward a side opposite to the shaft portion 621. The output shaft 62 is bearing-supported by the input shaft 61 via the ball bearing 142. A clutch space 620 is formed inside the cylinder portion 623.

The clutch 70 is provided in the clutch space 620 between the input shaft 61 and the output shaft 62. The clutch 70 includes a support portion 73, a friction plate 74, a friction plate 75, and a pressure plate 76. The support portion 73 is formed in a substantially circular-annular plate shape so as to extend radially outward from an outer peripheral wall of an end portion of the input shaft 61, on a driven cam 50 side with respect to the plate portion 622 of the output shaft 62.

The friction plate 74 is formed in a substantially circular-annular plate shape, and is provided on an outer edge portion of the support portion 73 on a plate portion 622 side of the output shaft 62. The friction plate 74 is fixed to the support portion 73. The friction plate 74 can come into contact with the plate portion 622 by deforming the outer edge portion of the support portion 73 toward the plate portion 622.

The friction plate 75 is formed in a substantially circular-annular plate shape, and is provided on the outer edge portion of the support portion 73 on a side opposite to the plate portion 622 of the output shaft 62. The friction plate 75 is fixed to the support portion 73.

The pressure plate 76 is formed in a substantially circular-annular plate shape, and is provided on the driven cam 50 side with respect to the friction plate 75.

In an engaged state in which the friction plate 74 and the plate portion 622 are in contact with each other, that is, engaged with each other, a frictional force is generated between the friction plate 74 and the plate portion 622, and relative rotation between the friction plate 74 and the plate portion 622 is restricted according to a magnitude of the frictional force. On the other hand, in a disengaged state in which the friction plate 74 and the plate portion 622 are separated from each other, that is, are not engaged with each other, the frictional force is not generated between the friction plate 74 and the plate portion 622, and the relative rotation between the friction plate 74 and the plate portion 622 is not restricted.

When the clutch 70 is in the engaged state, the torque input to the input shaft 61 is transmitted to the output shaft 62 via the clutch 70. On the other hand, when the clutch 70 is in the disengaged state, the torque input to the input shaft 61 is not transmitted to the output shaft 62.

The cover 625 is formed in a substantially circular-annular shape, and is provided on the cylinder portion 623 of the output shaft 62 so as to cover the pressure plate 76 from a side opposite to the friction plate 75.

In the present embodiment, the clutch device 1 includes a state changing unit 90 instead of the state changing unit 80 described in the first embodiment. The state changing unit 90 includes a diaphragm spring 91 as an "elastic deformation portion", a return spring 92, a release bearing 93, and the like.

The diaphragm spring 91 is formed in a substantially circular-annular disk spring shape, and is provided on the cover 625 such that one end in the axial direction, that is, an outer edge portion is in contact with the pressure plate 76. The diaphragm spring 91 is formed such that the outer edge portion is located on the clutch 70 side with respect to the inner edge portion, and a portion between the inner edge portion and the outer edge portion is supported by the cover 625. The diaphragm spring 91 is elastically deformable in the axial direction. Accordingly, the diaphragm spring 91 urges the pressure plate 76 toward the friction plate 75 by one end in the axial direction, that is, the outer edge portion. The pressure plate 76 is pressed against the friction plate 75. The friction plate 74 is pressed against the plate portion 622. That is, the clutch 70 is normally in the engaged state.

In the present embodiment, the clutch device 1 is a so-called normally closed clutch device that is normally in the engaged state.

The return spring 92 is, for example, a coil spring, and is provided on a side opposite to the driven cam main body 51 with respect to the driven cam step surface 53 such that one end of the return spring 92 is in contact with the driven cam step surface 53.

The release bearing 93 is provided between the other end of the return spring 92 and the inner edge portion of the diaphragm spring 91. The return spring 92 urges the release bearing 93 toward the diaphragm spring 91. The release bearing 93 bearing-supports the diaphragm spring 91 while receiving a load in a thrust direction from the diaphragm spring 91. An urging force of the return spring 92 is smaller than an urging force of the diaphragm spring 91.

As shown in FIG. 12, when the ball 3 is located at one end of the drive cam groove 400 and the driven cam groove 500, a distance between the drive cam 40 and the driven cam 50 is relatively small, and a gap Sp2 is formed between the release bearing 93 and the driven cam step surface 53 of the driven cam 50. Therefore, the friction plate 74 is pressed against the plate portion 622 by the urging force of the diaphragm spring 91, the clutch 70 is in the engaged state, and transmission of torque between the input shaft 61 and the output shaft 62 is allowed.

When electric power is supplied to the coil 22 of the motor 20 under the control of the ECU 10, the motor 20 rotates, the torque is output from the speed reducer 30, and the drive cam 40 rotates relatively with respect to the housing 12. Accordingly, the ball 3 rolls from one end to the other end of the drive cam groove 400 and the driven cam groove 500. Therefore, the driven cam 50 moves relatively with respect to the housing 12 and the drive cam 40 in the axial direction, that is, moves toward the clutch 70. Thus, the gap Sp2 between the release bearing 93 and the driven cam step surface 53 of the driven cam 50 is reduced, and the return spring 92 is compressed in the axial direction between the driven cam 50 and the release bearing 93.

When the driven cam 50 further moves toward the clutch 70, the return spring 92 is maximally compressed, and the release bearing 93 is pressed toward the clutch 70 by the driven cam 50. Accordingly, the release bearing 93 moves toward the clutch 70 against a reaction force from the diaphragm spring 91 while pressing the inner edge portion of the diaphragm spring 91.

When the release bearing 93 moves toward the clutch 70 while pressing the inner edge portion of the diaphragm spring 91, the inner edge portion of the diaphragm spring 91 moves toward the clutch 70, and the outer edge portion of the diaphragm spring 91 moves toward an opposite side of the clutch 70. Accordingly, the friction plate 74 is separated from the plate portion 622, and the state of the clutch 70 is changed from the engaged state to the disengaged state. As a result, transmission of torque between the input shaft 61 and the output shaft 62 is interrupted.

When the clutch transmission torque is zero, the ECU 10 stops the rotation of the motor 20. Accordingly, the state of the clutch 70 is maintained in the disengaged state. As described above, the diaphragm spring 91 of the state changing unit 90 receives a force in the axial direction from the driven cam 50, and can change the state of the clutch 70 to the engaged state or the disengaged state according to a relative position of the driven cam 50 in the axial direction with respect to the drive cam 40.

In the present embodiment, the inner sealing member 401 and the outer sealing member 402 as the "sealing members" can also maintain an airtight or liquid-tight state between the accommodation space 120 and the clutch space 620.

In the present embodiment, the clutch device 1 does not include the oil supply portion described in the first embodiment. That is, in the present embodiment, the clutch 70 is a dry clutch.

As described above, the present disclosure is also applicable to a normally closed clutch device including the dry clutch.

As described above, in the present embodiment, the state changing unit 90 includes the diaphragm spring 91 as the "elastic deformation portion" that is elastically deformable in the axial direction of the driven cam 50 as the "translation portion".

By controlling the rotation angle position of the motor 20, thrust control of the clutch 70 can be performed with high accuracy based on the displacement and load characteristics of the diaphragm spring 91. Therefore, the variation in the load acting on the clutch 70 with respect to the variation in the stroke of the driven cam 50 can be reduced. Accordingly, as in the first embodiment, the load control can be performed with high accuracy, and the clutch device 1 can be controlled with high accuracy.

Third Embodiment

Figure 13:
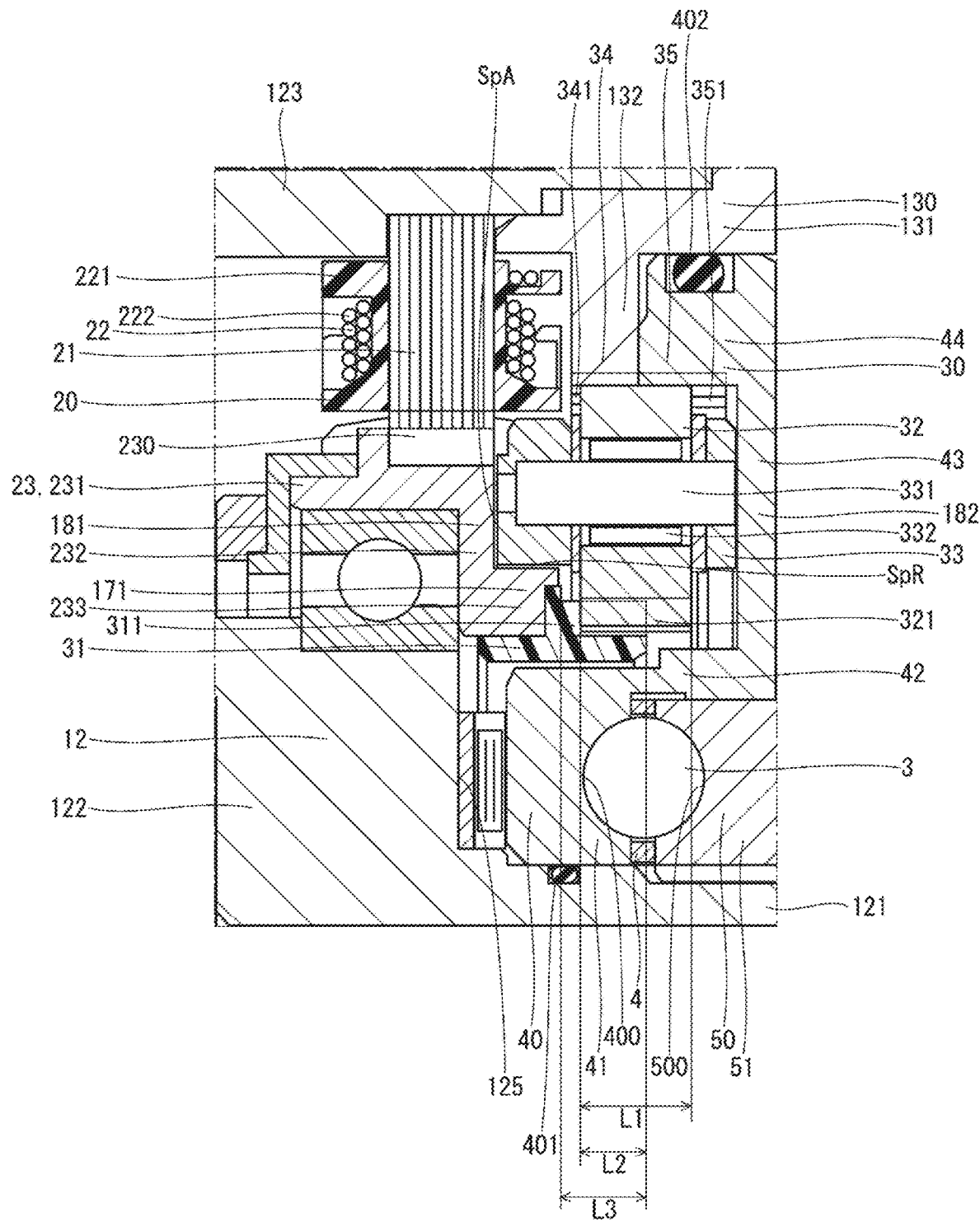
FIG. 13 is a cross-sectional view showing a sun gear and a vicinity thereof in a clutch device according to a third embodiment.

A part of a clutch device according to a third embodiment is shown in FIG. 13. The third embodiment is different from the first embodiment in a configuration of the sun gear 31 and the like.

In the present embodiment, the sun gear 31 is formed separately from the rotor 23 and is formed of a material having a specific gravity smaller than that of the rotor 23. More specifically, the sun gear 31 is formed of, for example, a resin. A specific gravity of the resin is smaller than that of pure iron forming the rotor 23.

As described above, in the present embodiment, the sun gear 31 is formed separately from the rotor 23 and is formed of a material having a specific gravity smaller than that of the rotor 23.

Therefore, an inertia moment around the sun gear 31 serving as the "input shaft" can be further reduced, and higher response can be achieved. The cost can be reduced and rattle noise can be lowered.

In the present embodiment, a 3k-type strange planetary gear speed reducer is employed, and the torque applied to the sun gear 31 is small, so that even if the sun gear 31 is formed of a material having a small specific gravity, there is no problem in strength.

Fourth Embodiment

Figure 14:
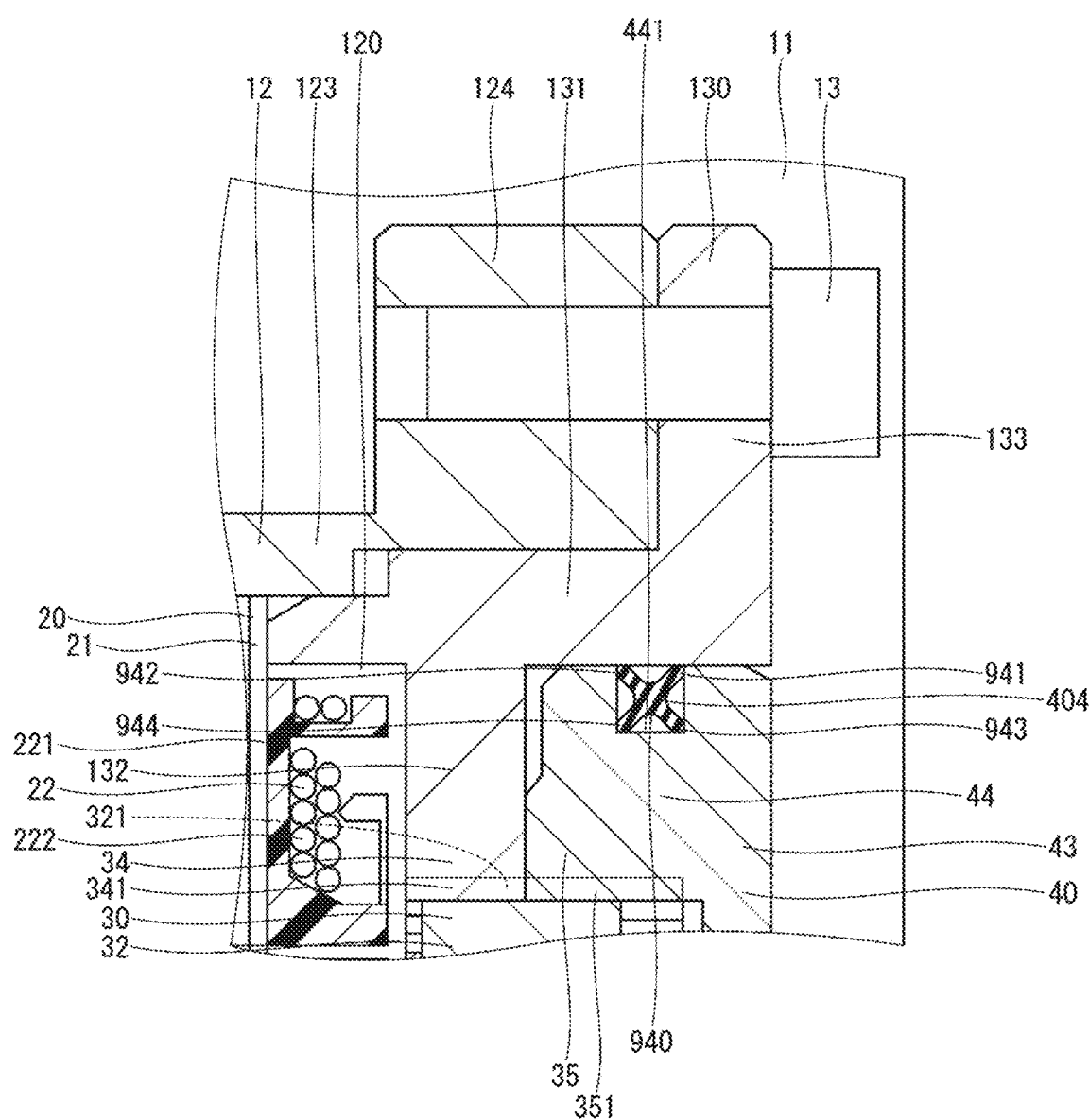
FIG. 14 is a cross-sectional view showing a part of a clutch device according to a fourth embodiment.

A part of a clutch device according to a fourth embodiment is shown in FIG. 14. The fourth embodiment is different from the first embodiment in the configuration of the sealing member.

In the present embodiment, the "sealing member" includes the inner sealing member 401 (not shown in FIG. 14) and an outer sealing member 404. Similarly to the inner sealing member 401, the outer sealing member 404 is formed in an annular shape using an elastic material such as rubber. More specifically, the outer sealing member 404 includes a seal annular portion 940, a first outer lip portion 941, a second outer lip portion 942, a first inner lip portion 943, and a second inner lip portion 944. The seal annular portion 940, the first outer lip portion 941, the second outer lip portion 942, the first inner lip portion 943, and the second inner lip portion 944 are integrally formed.

The seal annular portion 940 is formed in a substantially circular-annular shape. The first outer lip portion 941 is formed in an annular shape over the entire range in the circumferential direction of the seal annular portion 940 so as to extend from the seal annular portion 940 to be inclined radially outward and toward one side in the axial direction. The second outer lip portion 942 is formed in an annular shape over the entire range in the circumferential direction of the seal annular portion 940 so as to extend from the seal annular portion 940 to be inclined radially outward and toward the other side in the axial direction. The first inner lip portion 943 is formed in an annular shape over the entire range in the circumferential direction of the seal annular portion 940 so as to extend from the seal annular portion 940 to be inclined radially inward and toward one side in the axial direction. The second inner lip portion 944 is formed in an annular shape over the entire range in the circumferential direction of the seal annular portion 940 so as to extend from the seal annular portion 940 to be inclined radially inward and toward the other side in the axial direction. Accordingly, the outer sealing member 404 is formed to have an X-shape in a cross section taken along a virtual plane including all the axes (see FIG. 14).

As shown in FIG. 14, the outer sealing member 404 is provided in an annular seal groove portion 441 formed in the outer peripheral wall of the drive cam outer cylinder portion 44. Tip portions of the first inner lip portion 943 and the second inner lip portion 944 are in contact with the seal groove portion 441. That is, the outer sealing member 404 is provided so as to be in contact with the drive cam 40 on the radially outer side of the drive cam 40 as the "rotation portion".

Tip portions of the first outer lip portion 941 and the second outer lip portion 942 are in contact with the inner peripheral wall of the fixing cylinder portion 131 of the fixing portion 130. Therefore, a contact area between the outer sealing member 404 and the fixing portion 130 is smaller than a contact area between the outer sealing member 402 and the fixing portion 130 in the first embodiment. Accordingly, a sliding resistance acting on the outer sealing member 404 during the rotation of the drive cam 40 can be reduced.

The first outer lip portion 941 and the second outer lip portion 942 of the outer sealing member 404 seal the drive cam outer cylinder portion 44 and the inner peripheral wall of the fixing cylinder portion 131 in an airtight or liquid-tight manner while being elastically deformed in the radial direction. The outer sealing member 404 is a so-called lip seal.

The present embodiment has the same configuration as that of the first embodiment except for the above-described points.

As described above, in the present embodiment, the outer sealing member 404 as the "sealing member" is a lip seal. Therefore, the contact area between the outer sealing member 404 and the fixing portion 130 can be reduced. Accordingly, a sliding resistance acting on the outer sealing member 404 during the rotation of the drive cam 40 can be reduced. Therefore, a decrease in efficiency during operation of the clutch device 1 can be reduced.

Fifth Embodiment

Figure 15:
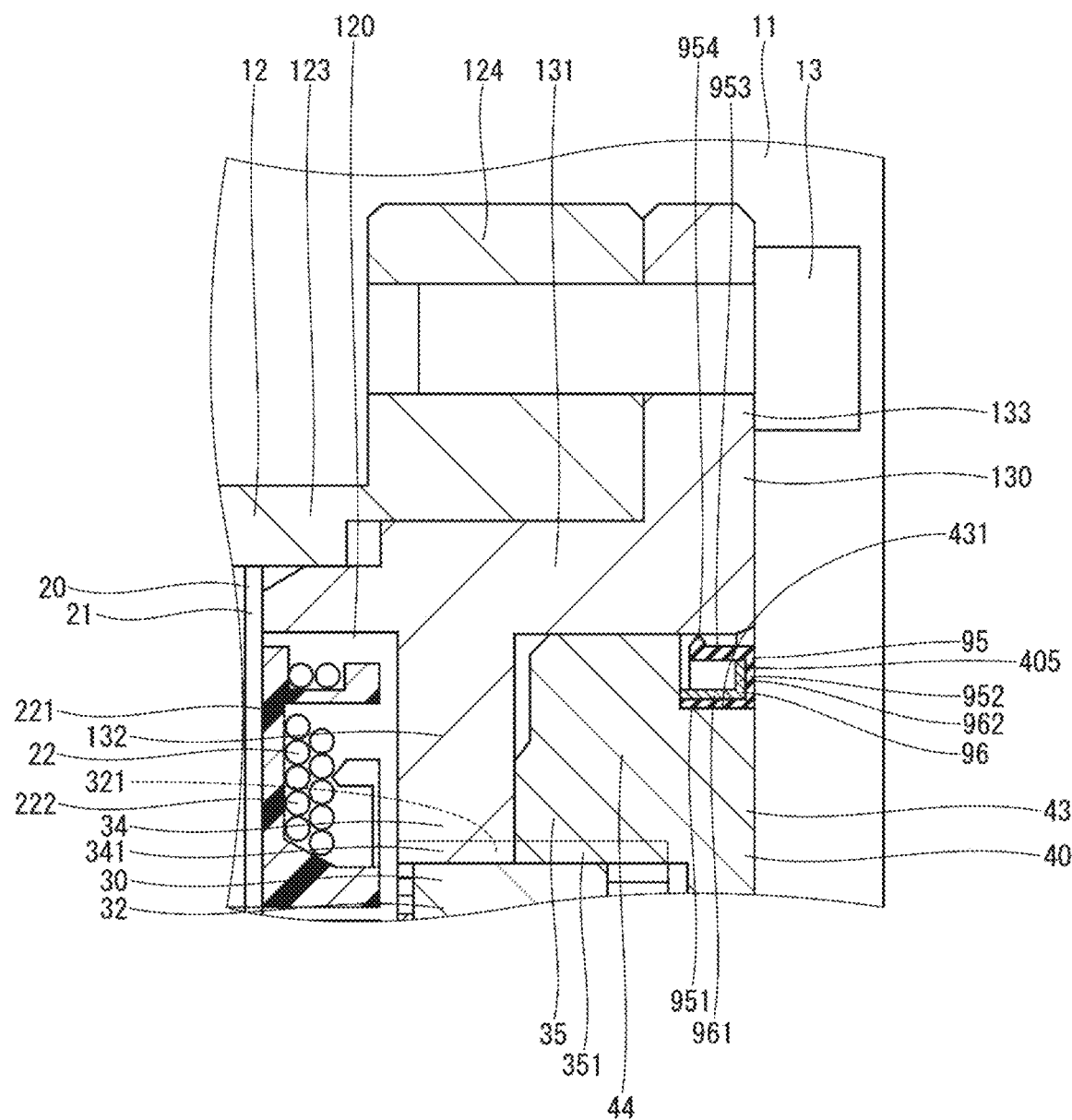
FIG. 15 is a cross-sectional view showing a part of a clutch device according to a fifth embodiment.

A part of a clutch device according to a fifth embodiment is shown in FIG. 15. The fifth embodiment is different from the first embodiment in the configuration of the sealing member.

In the present embodiment, the "sealing member" includes the inner sealing member 401 (not shown in FIG. 15) and an outer sealing member 405. The outer sealing member 405 includes a seal main body 95 and a metal ring 96. The seal main body 95 is formed in an annular shape using an elastic material such as rubber. The metal ring 96 is formed of metal in an annular shape.

More specifically, the seal main body 95 includes a seal inner cylinder portion 951, a seal plate portion 952, a seal outer cylinder portion 953, and a seal lip portion 954. The seal inner cylinder portion 951, the seal plate portion 952, the seal outer cylinder portion 953, and the seal lip portion 954 are integrally formed.

The seal inner cylinder portion 951 is formed in a substantially cylindrical shape. The seal plate portion 952 is formed in an annular plate shape so as to extend radially outward from one end portion of the seal inner cylinder portion 951. The seal outer cylinder portion 953 is formed in a substantially cylindrical shape so as to extend from an outer edge portion of the seal plate portion 952 to the same side as the seal inner cylinder portion 951. An end portion of the seal outer cylinder portion 953 opposite to the seal plate portion 952 is located closer to the seal plate portion 952 than an end portion of the seal inner cylinder portion 951 opposite to the seal plate portion 952. The seal lip portion 954 is formed in an annular shape so as to protrude radially outward from the end portion of the seal outer cylinder portion 953 opposite to the seal plate portion 952. The seal lip portion 954 is formed such that a shape of a tip portion thereof, which is an outer edge portion thereof, is substantially a right angle in a cross section taken along a virtual plane including the all the axes (see FIG. 15).

The metal ring 96 includes a metal cylinder portion 961 and a metal plate portion 962. The metal cylinder portion 961 and the metal plate portion 962 are integrally formed.

The metal cylinder portion 961 is formed in a substantially cylindrical shape. The metal plate portion 962 is formed in an annular plate shape so as to extend radially outward from one end portion of the metal cylinder portion 961. Accordingly, the metal ring 96 is formed to have an L shape in a cross section taken along a virtual plane including all the axes (see FIG. 15).

The metal ring 96 is integrally formed with the seal main body 95 such that an inner peripheral wall of the metal cylinder portion 961 is in contact with an outer peripheral wall of the seal inner cylinder portion 951, and a surface of the metal plate portion 962 opposite to the metal cylinder portion 961 is in contact with a surface of the seal plate portion 952 on a seal inner cylinder portion 951 side. The "integrally formed" means, for example, integrally forming multiple members by insert molding or the like (the same applies hereinafter).

As shown in FIG. 15, the outer sealing member 405 is provided in an annular seal groove portion 431 formed in an outer peripheral wall of the drive cam plate portion 43. The seal groove portion 431 is formed so as to extend toward the drive cam outer cylinder portion 44 from an end surface of the drive cam plate portion 43 opposite to the drive cam outer cylinder portion 44.

In the outer sealing member 405, an inner peripheral wall of the seal inner cylinder portion 951 is in contact with the seal groove portion 431. That is, the outer sealing member 405 is provided so as to be in contact with the drive cam 40 on the radially outer side of the drive cam 40 as the "rotation portion".

A tip portion of the seal lip portion 954, which is an outer edge portion of the seal lip portion 954, is in contact with the inner peripheral wall of the fixing cylinder portion 131 of the fixing portion 130. Therefore, a contact area between the outer sealing member 405 and the fixing portion 130 is significantly reduced as compared with a contact area between the outer sealing member 402 and the fixing portion 130 in the first embodiment. Accordingly, a sliding resistance acting on the outer sealing member 405 during rotation of the drive cam 40 can be significantly reduced.

The seal lip portion 954 of the outer sealing member 405 seals the drive cam plate portion 43 and the inner peripheral wall of the fixing cylinder portion 131 in an airtight or liquid-tight manner while being elastically deformed in the radial direction. The outer sealing member 405 is a so-called oil seal.

The metal ring 96 stabilizes a shape of the outer sealing member 405, in particular, a shape of the seal inner cylinder portion 951 and the seal plate portion 952. Since the seal lip portion 954 is formed at the end portion of the seal outer cylinder portion 953 opposite to the seal plate portion 952, the tip portion of the seal lip portion 954 can flexibly follow the inner peripheral wall of the fixing cylinder portion 131 by elastically deforming the end portion of the seal outer cylinder portion 953 in the radial direction.

The present embodiment has the same configuration as that of the first embodiment except for the above-described points.

As described above, in the present embodiment, the outer sealing member 405 as the "sealing member" is an oil seal.

Therefore, the contact area between the outer sealing member 405 and the fixing portion 130 can be reduced. Accordingly, the sliding resistance acting on the outer sealing member 405 during the rotation of the drive cam 40 can be reduced. Therefore, a decrease in efficiency during operation of the clutch device 1 can be reduced.

OTHER EMBODIMENTS

In the above-described embodiments, the meshing length L2 between the sun gear 31 and the planetary gear 32 is set to about 50% of the gear width L1 of the planetary gear 32. On the other hand, in another embodiment, the meshing length L2 between the sun gear 31 and the planetary gear 32 may be set to any length with respect to the gear width L1 of the planetary gear 32 as long as the meshing length L2 is smaller than the gear width L1 of the planetary gear 32.

In the above-described third embodiment, the sun gear 31 is formed of a resin, which is a material having a specific gravity smaller than that of the rotor 23. On the other hand, in another embodiment, the sun gear 31 may be formed of, for example, aluminum, which is a material having a specific gravity smaller than that of the rotor 23.

In another embodiment, the rotor 23 and the sun gear 31 may be integrally formed of the same material.

In another embodiment, the motor 20 may not include the magnet 230 as the "permanent magnet".

In another embodiment, the drive cam 40 as the "rotation portion" may be formed separately from the second ring gear 35 of the speed reducer 30.

In another embodiment, the drive cam 40 as the "rotation portion" may be formed such that the inner edge portion and the outer edge portion are at the same position in the axial direction.

In another embodiment, the sealing member for maintaining an airtight or liquid-tight state between the accommodation space and the clutch space may not be provided.

In the above-described embodiments, the inner rotor type motor 20 in which the rotor 23 is provided on the radially inner side of the stator 21 has been described. However, in another embodiment, the motor 20 may be an outer rotor type motor in which the rotor 23 is provided on the radially outer side of the stator 21.

In the above-described embodiments, an example has been shown in which the rotational translation unit is a rolling body cam including a drive cam, a driven cam, and a rolling element. On the other hand, in another embodiment, the rotational translation unit may be configured by, for example, a "slide screw" or a "ball screw" as long as the rotational translation portion includes a rotation portion that rotates relatively with respect to the housing and a translation portion that moves with respect to the housing in the axial direction when the rotation portion rotates with respect to the housing.

In another embodiment, an elastic deformation portion of the state changing unit may be, for example, a coil spring, rubber, or the like as long as the elastic deformation portion is elastically deformable in the axial direction. In another embodiment, the state changing unit may not include the elastic deformation portion, and may be configured only by a rigid body.

In another embodiment, the number of the drive cam grooves 400 and the number of the driven cam grooves 500 are not limited to five and any number of grooves may be formed as long as the number of the drive cam grooves 400 and the number of the driven cam grooves 500 are three or more. Any number of balls 3 may be provided according to the number of the drive cam grooves 400 and the driven cam grooves 500.

The present disclosure is not limited to a vehicle that travels by drive torque from an internal combustion engine, and can be applied to an electric vehicle, a hybrid vehicle, or the like that can travel by drive torque from a motor.

In another embodiment, the torque may be input from the second transmission portion, and output from the first transmission portion via the clutch. For example, when one of the first transmission portion and the second transmission portion is non-rotatably fixed, the rotation of the other of the first transmission portion and the second transmission portion can be stopped by engaging the clutch. In this case, the clutch device can be used as a brake device.

As described above, the present disclosure is not limited to the above-described embodiments and can be implemented in a variety of embodiments without departing from the scope of the subject matter.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A clutch device comprising:
   a housing;
   a prime mover including a stator fixed to the housing, and a rotor rotatable relative to the stator, the prime mover being capable of outputting torque from the rotor by supply of electric power to the prime mover;
   a speed reducer configured to output the torque of the prime mover at a reduced speed;
   a rotational translation unit including a rotation portion that rotates relative to the housing upon receiving an input of the torque output from the speed reducer, and a translation portion that moves relative to the housing in an axial direction in accordance with rotation of the rotation portion relative to the housing;
   a clutch provided between a first transmission portion and a second transmission portion that are rotatable relative to the housing, the clutch being configured to allow transmission of torque between the first transmission portion and the second transmission portion in an engaged state of the clutch, and interrupt the transmission of torque between the first transmission portion and the second transmission portion in a disengaged state of the clutch; and
   a state changing unit configured to receive a force along the axial direction from the translation portion and change a state of the clutch to the engaged state or the disengaged state according to a position of the translation portion in the axial direction relative to the housing, wherein
   the speed reducer includes a sun gear rotatable integrally together with the rotor, and a planetary gear configured to revolve in a circumferential direction of the sun gear while rotating in a state of meshing with the sun gear, and
   a gear width of the sun gear is set such that a length in the axial direction by which the sun gear and the planetary gear are overlapped is smaller than a gear width of the planetary gear, wherein
   the sun gear and the planetary gear are configured such that $C-L2 \cdot \tan \alpha \geq 0$ and $L1 > L2$,
   where C is a backlash in a circumferential direction on a meshing pitch circle between the sun gear and the planetary gear when an inclination angle of the planetary gear with respect to the sun gear is 0, $\alpha$ is an inclination angle of the planetary gear with respect to the sun gear, L1 is the gear width of the planetary gear, and L2 is the meshing length between the sun gear and the planetary gear.

2. The clutch device according to claim 1, wherein the length by which the sun gear and the planetary gear are overlapped is set within a range from 20% to 50% of the gear width of the planetary gear in length.

3. The clutch device according to claim 1, wherein the sun gear is formed separately from the rotor and is formed of a material having a specific gravity smaller than a specific gravity of the rotor.

4. The clutch device according to claim 1, wherein the prime mover includes a permanent magnet provided in the rotor.

5. The clutch device according to claim 1, wherein the speed reducer includes
   an annular carrier rotatably supporting the planetary gear and being rotatable relative to the sun gear,
   a first ring gear capable of meshing with the planetary gear, and
   a second ring gear capable of meshing with the planetary gear and outputting the torque to the rotational translation unit, the second ring gear being different from the first ring gear in number of teeth of a tooth portion.

6. The clutch device according to claim 5, wherein
   the first ring gear is fixed to the housing, and
   the second ring gear is integrally rotatable with the rotation portion.

7. The clutch device according to claim 5, wherein the rotation portion is formed integrally with the second ring gear.

8. The clutch device according to claim 1, wherein
   the rotation portion is a drive cam having drive cam grooves formed on one surface of the rotation portion,
   the translation portion is a driven cam having driven cam grooves formed on one surface of the translation portion, and
   the rotational translation unit is a rolling body cam including the drive cam, the driven cam and rolling bodies, the rolling bodies being rollable between the drive cam grooves and the driven cam grooves.

9. The clutch device according to claim 1, wherein the rotation portion having an inner edge portion and an outer edge portion that are located at different positions in the axial direction.

10. The clutch device according to claim 1, wherein
    the prime mover and the speed reducer are provided in an accommodation space formed inside the housing, the rotation portion being positioned between the accommodation space and the clutch,
    the clutch is provided in a clutch space, the rotation portion being positioned between the accommodation space and the clutch space, and
    the clutch device further comprises an annular sealing member being in contact with the rotation portion and maintaining an air-tight or liquid-tight state between the accommodation space and the clutch space.

11. The clutch device according to claim 10, wherein the sealing member is an O-ring, a lip seal, or an oil seal.

12. The clutch device according to claim 1, wherein the state changing unit includes an elastic deformation portion that is elastically deformable in the axial direction of the translation portion.

13. A clutch device comprising:
    a housing;
    a prime mover including a stator fixed to the housing, and a rotor rotatable relative to the stator, the prime mover being capable of outputting torque from the rotor by supply of electric power to the prime mover;
    a speed reducer configured to output the torque of the prime mover at a reduced speed;
    a rotational translation unit including a rotation portion that rotates relative to the housing upon receiving an input of the torque output from the speed reducer, and a translation portion that moves relative to the housing in an axial direction in accordance with rotation of the rotation portion relative to the housing;
    a clutch provided between a first transmission portion and a second transmission portion that are rotatable relative to the housing, the clutch being configured to allow transmission of torque between the first transmission portion and the second transmission portion in an engaged state of the clutch, and interrupt the transmission of torque between the first transmission portion and the second transmission portion in a disengaged state of the clutch; and a spring configured to receive a force along the axial direction from the translation portion and change a state of the clutch to the engaged state or the disengaged state according to a position of the translation portion in the axial direction relative to the housing, wherein the speed reducer includes a sun gear rotatable integrally together with the rotor, and a planetary gear configured to revolve in a circumferential direction of the sun gear while rotating in a state of meshing with the sun gear, and a gear width of the sun gear is set such that a length in the axial direction by which the sun gear and the planetary gear are overlapped is smaller than a gear width of the planetary gear, wherein the sun gear and the planetary gear are configured such that $C - L2 \cdot \tan \alpha \geq 0$ and $L1 > L2$, where C is a backlash in a circumferential direction on a meshing pitch circle between the sun gear and the planetary gear when an inclination angle of the planetary gear with respect to the sun gear is 0, a is an inclination angle of the planetary gear with respect to the sun gear, $L1$ is the gear width of the planetary gear, and $L2$ is the meshing length between the sun gear and the planetary gear.

\* \* \* \* \*